United States Patent
Nemoto

(10) Patent No.: US 10,807,442 B2
(45) Date of Patent: Oct. 20, 2020

(54) WIND DIRECTION ADJUSTMENT DEVICE

(71) Applicant: NIFCO INC., Yokosuka-shi, Kanagawa (JP)

(72) Inventor: Takehiko Nemoto, Yokosuka (JP)

(73) Assignee: NIFCO INC., Yokosuka-Shi, Kanagawa (JP)

(*) Notice: Subject to any disclaimer, the term of this patent is extended or adjusted under 35 U.S.C. 154(b) by 316 days.

(21) Appl. No.: 15/779,707

(22) PCT Filed: Nov. 25, 2016

(86) PCT No.: PCT/JP2016/085010
§ 371 (c)(1),
(2) Date: May 29, 2018

(87) PCT Pub. No.: WO2017/094619
PCT Pub. Date: Jun. 8, 2017

(65) Prior Publication Data
US 2020/0207186 A1    Jul. 2, 2020

(30) Foreign Application Priority Data
Nov. 30, 2015  (JP) .................................. 2015-232570

(51) Int. Cl.
*B60H 1/34* (2006.01)
*F24F 13/14* (2006.01)

(52) U.S. Cl.
CPC ........... *B60H 1/3421* (2013.01); *B60H 1/345* (2013.01); *B60H 2001/3471* (2013.01); *F24F 2013/1473* (2013.01)

(58) Field of Classification Search
CPC ........... B60H 1/3421; B60H 2001/3471; F24F 2013/1473
(Continued)

(56) References Cited

U.S. PATENT DOCUMENTS 3,063,357 A    11/1962  Eberhart
5,364,303 A    11/1994  Terry
(Continued)

FOREIGN PATENT DOCUMENTS

CN    1160838 A    10/1997
CN    201129832 Y    10/2008
(Continued)

OTHER PUBLICATIONS

PCT/ISA/210, "International Search Report for International Application No. PCT/JP2016/085010," dated Feb. 7, 2017.
(Continued)

*Primary Examiner* — Helena Kosanovic
(74) *Attorney, Agent, or Firm* — Manabu Kanesaka

(57) ABSTRACT

A wind direction adjustment device includes a plurality of fins supported at top and bottom end sides in a case; a link mechanism associating the fins; a horizontal-fin supported at right and left end sides at second support portions in the case; and a knob supported movably to front and back and to right and left relative to the horizontal fin. The wind direction adjustment device adjustably switches between a parallel air-blowing mode wherein the fins become approximately parallel to one another and a dispersive air-blowing mode wherein two or more of the fins are turned in opposite directions through the knob. The parallel air-blowing mode is switched to the dispersive air-blowing mode by operating the knob forward or backward in an air-blowing direction, wherein by operating the knob to a right or left side, some fins turn in an approximately same direction to switch a dispersive air-blowing direction.

4 Claims, 17 Drawing Sheets

(58) Field of Classification Search
USPC .......................................................... 454/155
See application file for complete search history.

(56) References Cited

U.S. PATENT DOCUMENTS

| | | | |
|---|---|---|---|
| 5,690,550 A | 11/1997 | Mikowski | |
| 9,878,596 B2 | 1/2018 | Ross et al. | |
| 2016/0313025 A1* | 10/2016 | Nemoto | B60H 1/345 |

FOREIGN PATENT DOCUMENTS

| | | |
|---|---|---|
| CN | 104723842 A | 6/2015 |
| DE | 102011115178 A1 | 3/2013 |
| DE | 102012015519 A1 | 2/2014 |
| EP | 1270286 A2 | 1/2003 |
| JP | S53-97849 U | 8/1978 |
| JP | H02-103584 U | 5/1992 |
| JP | 2005-132312 A | 5/2005 |
| JP | 2015/087975 A1 | 6/2015 |

OTHER PUBLICATIONS

China Patent Office, "Office Action for Chinese Patent Application No. 201680069539.X," dated Jun. 30, 2020.
Germany Patent Office, "Office Action for German Patent Application No. 112016005468.8," dated Apr. 20, 2020.

* cited by examiner

WIND DIRECTION ADJUSTMENT DEVICE

FIELD OF TECHNOLOGY

The present invention relates to a wind direction adjustment device.

BACKGROUND ART

FIG. 16 shows a wind direction adjustment device for a vehicle disclosed in Patent Document 1. This device structure comprises a case 12 set in such a way so as to blow out air to outside from a front-side opening portion; a plurality of fins 16A to 16G (16) supported at both top and bottom ends in a pivotally turnable manner with respect to facing support portions 19A and 19B (19) inside the case 12; a link mechanism 14 associating with two or more of the fins 16; a horizontal-type fin 13 supported at both right and left ends in a pivotally turnable manner with respect to facing second support portions 17A and 17B (17) inside the case 12; and an operation knob 18 supported movably to front and back and to right and left relative to the horizontal-type fin 13. In the switching operation, the fins 16 can be switched among a parallel air-blowing mode which becomes approximately parallel to one another as shown in FIG. 17(a); a dispersive air-blowing mode wherein two or more of the fins 16 turn in directions opposite to each other as shown in FIG. 17(b); and an inclined air-blowing mode wherein the fins 16 are inclined approximately in parallel to one another as shown in FIG. 17(c).

Namely, in the parallel air-blowing mode, the knob 18 is at an initial or usual position in FIG. 17(a) relative to the horizontal-type fin 13, i.e., in a state wherein the knob 18 is moved to a middle of the right and left of the horizontal-type fin 13. In the dispersive air-blowing mode, the knob 18 is pulled in a front direction in the parallel air-blowing mode so as to become a state wherein the fins 16A to 16C and the fins 16E to 16G turn in opposite directions through the link mechanism 14. In a case of returning from the dispersive air-blowing mode to the horizontal air-blowing mode again, when the knob 18 is operated to push, the intermediate fin 16D moves up to an original usual position, and associated with that, the other fins 16A to 16G are also switched to the horizontal air-blowing mode which is a state wherein the other fins 16A to 16G are approximately parallel to one another through corresponding links 14A to 14D. In the inclined air-blowing mode, the knob 18 moves horizontally in an arrow direction from the parallel air-blowing mode, and all of the fins 16A to 16G turn in the same direction so as to become a state inclined approximately in parallel to one another.

PRIOR ART DOCUMENT

Patent Document

Patent Document 1: WO2015/087975

SUMMARY OF THE INVENTION

Problems to be Solved by the Invention

In the aforementioned structure, as for advantages, since the operation knob is supported movably to the front and back and to the right and left relative to the horizontal-type fin so as to simplify a support structure of the knob, and by a knob operation, an air-blowing mode of a plurality of fins which is a vertical type can be switched to three patterns of the parallel air-blowing mode, the dispersive air-blowing mode, and the inclined air-blowing mode. However, in the switching operation, in a case of switching from the dispersive air-blowing mode to the inclined air-blowing mode by the knob, after the knob is pushed to switch to the parallel air-blowing mode, the knob has to be moved to the right and left.

In other words, in the dispersive air-blowing mode in FIG. 17(b), the knob cannot move to the right and left unless the knob is pushed to return to the usual positon once. Consequently, an operator carries out a switching operation between the dispersive air-blowing mode and the parallel air-blowing mode by moving the knob in a front-and-back direction without hesitation; however, since the knob cannot move in a right-and-left direction in a state of the dispersive air-blowing mode, there is a possibility that an operator abandons a changeover to the inclined air-blowing mode further. This means that even if many air-blowing modes are made, they become the air-blowing modes which are not used due to a complication of the knob operation so as not to sufficiently provide usability and a commercial value.

An object of the present invention is to solve the aforementioned problems, to simplify a switching operability by allowing the operation knob to move in the right-and-left direction in the state of the dispersive air-blowing mode so as to switch a dispersive air-blowing direction, and to solve the possibility that an operator abandons the changeover. Another object of the present invention is to improve the commercial value by increasing the air-blowing aspects further. Furthermore, other objects of the present invention will be clarified in the following explanation of contents.

Means for Solving the Problems

In order to obtain the aforementioned objects, the present invention provides a wind direction adjustment device comprising a case set to blow out air to an outside from a front-side opening portion; a plurality of fins supported at both top and bottom ends in a pivotally turnable manner with respect to facing first support portions inside the case; a link mechanism associating two or more of the fins; a horizontal-type fin supported at both right and left end sides in a pivotally turnable manner with respect to facing second support portions inside the case; and an operation knob supported so as to be movable to front and back and to right and left with respect to the horizontal-type fin, and the wind direction adjustment device can adjustably switch between a parallel air-blowing mode wherein the fins become approximately parallel to one another and a dispersive air-blowing mode wherein two or more of the fins are turned in directions opposite to each other through the operation knob. Also, the parallel air-blowing mode is switched to the dispersive air-blowing mode through the link mechanism by operating to move the operation knob forward or backward in an air-blowing direction, and in that state, by operating to move the operation knob to a right or left side, some fins of the plurality of fins turn in an approximately same direction so as to switch a dispersive air-blowing direction.

The present invention may be embodied as described in the following (1) to (4).

(1) The operation knob is supported at the horizontal-type fin through a slider; an operation of the slider is restricted to a right-and-left direction or a front-and-back direction relative to the horizontal-type fin; and an operation of the operation knob is restricted to the front-and-back direction or the right-and-left direction relative to the slider. According to the aspect, the operation knob is supported at the horizontal-type fin through the slider, so that the operation of the slider can be restricted to a horizontal direction, i.e., the right-and-left direction relative to the horizontal-type fin, and the operation of the operation knob can be restricted to the front-and-back direction relative to the slider, thereby, an operation changeover can be carried out without wobbling, an appearance can be improved, and an excellent operability can be easily obtained as well. Incidentally, in a relationship between the operation knob and the slider, the operation of the slider can be restricted to the front-and-back direction relative to the horizontal-type fin, and the operation of the operation knob can be restricted to the horizontal direction, i.e., the right-and-left direction relative to the slider.

(2) Each of the fins includes a fin shaft portion supported in a pivotally turnable manner with respect to the first support portions in the case; and a link shaft portion pivotally supported at a link forming the link mechanism, and in the dispersive air-blowing mode, the fin shaft portions are placed in front of the link shaft portion, so that two or more of the fins turn a front side outwardly to each other so as to disperse an air-blowing direction in the right-and-left direction. Here, "two or more of the fins turn a front side outwardly to each other" means that the two or more fins turn the front side thereof to a side separating from a middle thereof as a boundary of the middle of the right and left of the opening portion. According to the aspect, the fin shaft portion is placed in front of the link shaft portion, so that the two or more of the fins turn the front side outwardly to each other so as to disperse the air-blowing direction in the right-and-left direction.

(3) Each of the fins includes the fin shaft portion supported in the pivotally turnable manner with respect to the first support portion in the case; and the link shaft portion pivotally supported at the link forming the link mechanism, and in the dispersive air-blowing mode, the fin shaft portion is placed behind the link shaft portion, so that the two or more of the fins turn the front side inwardly to each other so as to disperse the air-blowing direction in an up-and-down direction. Here, "two or more of the fins turn the front side inwardly to each other" means that the two or more fins turn the front side thereof to an intermediate side of the right and left of the opening portion. According to the aspect, the fin shaft portions are placed behind the link shaft portion, so that the two or more of the fins turn the front side inwardly to each other so as to disperse the air-blowing direction in the up-and-down direction. Advantages of the aspect described in (2) and (3) are such that as for the dispersive air-blowing mode of the present invention, there can be easily selected between a horizontal dispersive type, i.e., a structure wherein the respective fins on a left side and a right side as a boundary of an intermediate fin respectively face outward; and a vertical dispersive type, i.e., a structure (in this structure, air blows out from left and right directions toward the middle, and collide at the middle so as to become a flow in a vertical direction) wherein the respective fins on the left side and the right side as the boundary of the intermediate fin respectively face inward.

(4) The fins can be switched between the parallel air-blowing mode where the fins become approximately parallel to one another by moving the operation knob to a usual position; the dispersive air-blowing mode wherein the two or more of the fins are turned in the directions opposite to each other by moving the operation knob in the front-and-back direction from the usual position; an inclined air-blowing mode wherein the fins are inclined approximately in parallel to one another by turning in the same direction by moving the operation knob in the right-and-left direction from the usual position; and a deformation dispersive air-blowing mode wherein inclination angles of a left side fin and a right side fin sandwiching the intermediate fin differ by moving the operation knob in the right-and-left direction in the dispersive air-blowing mode. According to the aspect, a selection of an air-blowing aspect has four types of the parallel air-blowing mode, the dispersive air-blowing mode, the inclined air-blowing mode, and the deformation dispersive air-blowing mode so as to improve a commercial value by increasing an air-blowing aspect pattern. Obviously, in the dispersive air-blowing mode, the inclined air-blowing mode, and the deformation dispersive air-blowing mode, a minor adjustment can be carried out as well by varying an angle of each fin.

Effect of the Invention

In the present invention, as for a structure comprising the link mechanism associating the two or more of the fins among the plurality of fins, and the operation knob, and adjustably switching between the parallel air-blowing mode wherein the fins become approximately parallel to one another, and the dispersive air-blowing mode wherein the two or more of the fins turn in the directions opposite to each other, for example, an operator selects and switches the parallel air-blowing mode and the dispersive air-blowing mode by moving the operation knob in the front-and-back directions. Additionally, the operator can switch the dispersive air-blowing direction to the deformation dispersive air-blowing mode as shown in an example by turning some fins of the plurality of fins in the approximately same direction by the moving operation of the operation knob to the left side or the right side, i.e., the horizontal direction in a state of the dispersive air-blowing mode. This advantage is that in a case of the example, after a switching operation of the air-blowing aspect is switched from the parallel air-blowing mode to the dispersive air-blowing mode by pulling and moving the operation knob from the usual position, subsequently, by moving the operation knob in the horizontal direction, the dispersive air-blowing mode can be switched to the deformation dispersive air-blowing mode consecutively. Consequently, in the switching structure, by allowing consecutive switching operations by the operation knob, a switching operability of the air-blowing aspect can be simplified, so that as mentioned in the Problems to be Solved by the Invention, it becomes useful for solving the possibility that an operator abandons the changeover.

BRIEF DESCRIPTION OF THE DRAWINGS

FIGS. 1(a) and 1(b) show external appearances of a wind direction adjustment device according to the first embodiment of the present invention, wherein FIG. 1(a) is a drawing in a parallel air-blowing mode; and FIG. 1(b) is a drawing in a state wherein a horizontal-type fin is inclined upward obliquely from FIG. 1(a).

FIGS. 2(a), 2(b), and 2(c) show details of the wind direction adjustment device in the aforementioned parallel air-blowing mode state, wherein FIG. 2(a) is a top view; FIG. 2(b) is a front view; and FIG. 2(c) is a side view.

FIGS. 3(a) and 3(b) show a wind direction adjustment device in the aforementioned parallel air-blowing mode state, wherein FIG. 3(a) is a schematic horizontal cross-sectional view; and FIG. 3(b) is an enlarged view showing an exposed state of a slider in a state wherein an upper knob is removed in an X portion in FIG. 3(a).

FIGS. 4(a) and 4(b) show a wind direction adjustment device which is switched to a horizontal dispersive air-blowing mode, wherein FIG. 4(a) is a schematic horizontal cross-sectional view; and FIG. 4(b) is an enlarged view showing an exposed state of the slider in the state wherein the upper knob is removed in an X portion in FIG. 4(a).

FIGS. 5(a) and 5(b) show a wind direction adjustment device which is switched to an inclined air-blowing mode, wherein FIG. 5(a) is a schematic horizontal cross-sectional view; and FIG. 5(b) is an enlarged view showing an exposed state of the slider in the state wherein the upper knob is removed in an X portion in FIG. 5(a).

FIGS. 6(a) and 6(b) show a wind direction adjustment device which is switched to a deformation dispersive air-blowing mode, wherein FIG. 6(a) is a schematic horizontal cross-sectional view; and FIG. 6(b) is an enlarged view showing an exposed state of the slider in the state wherein the upper knob is removed in an X portion in FIG. 6(a).

FIGS. 9(a), 9(b), 9(c), and 9(d) show a relationship of the slider and the horizontal-type fin of the wind direction adjustment device, wherein FIG. 9(a) is a top view of the slider; FIG. 9(b) is a side view thereof; FIG. 9(c) is a top view of the horizontal-type fin; and FIG. 9(d) is a side view thereof.

FIGS. 10(a), 10(b), 10(c), and 10(d) show a knob of the wind direction adjustment device, wherein FIG. 10(a) is a top view of the upper knob; FIG. 10(b) is a side view thereof; FIG. 10(c) is a top view of a lower knob; and FIG. 10(d) is a side view thereof.

FIGS. 12(a) and 12(b) show a wind direction adjustment device of the second embodiment corresponding to FIGS. 3(a) and 3(b), wherein FIG. 12(a) is a schematic horizontal cross-sectional view; and FIG. 12(b) is an enlarged view showing an exposed state of the slider in the state wherein the upper knob is removed in a Y portion in FIG. 12(a).

FIGS. 13(a) and 13(b) show a wind direction adjustment device of the second embodiment corresponding to FIGS. 4(a) and 4(b), wherein FIG. 13(a) is a schematic horizontal cross-sectional view; and FIG. 13(b) is an enlarged view showing an exposed state of the slider in the state wherein the upper knob is removed in a Y portion in FIG. 13(a).

FIGS. 14(a) and 14(b) show a wind direction adjustment device of the second embodiment corresponding to FIGS. 5(a) and 5(b), wherein FIG. 14(a) is a schematic horizontal cross-sectional view; and FIG. 14(b) is an enlarged view showing an exposed state of the slider in the state wherein the upper knob is removed in a Y portion in FIG. 14(a).

FIGS. 15(a) and 15(b) show a wind direction adjustment device of the second embodiment corresponding to FIGS. 6(a) and 6(b), wherein FIG. 15(a) is a schematic horizontal cross-sectional view; and FIG. 15(b) is an enlarged view showing an exposed state of the slider in the state wherein the upper knob is removed in a Y portion in FIG. 15(a).

BEST MODES OF CARRYING OUT THE INVENTION

Figure 1A:
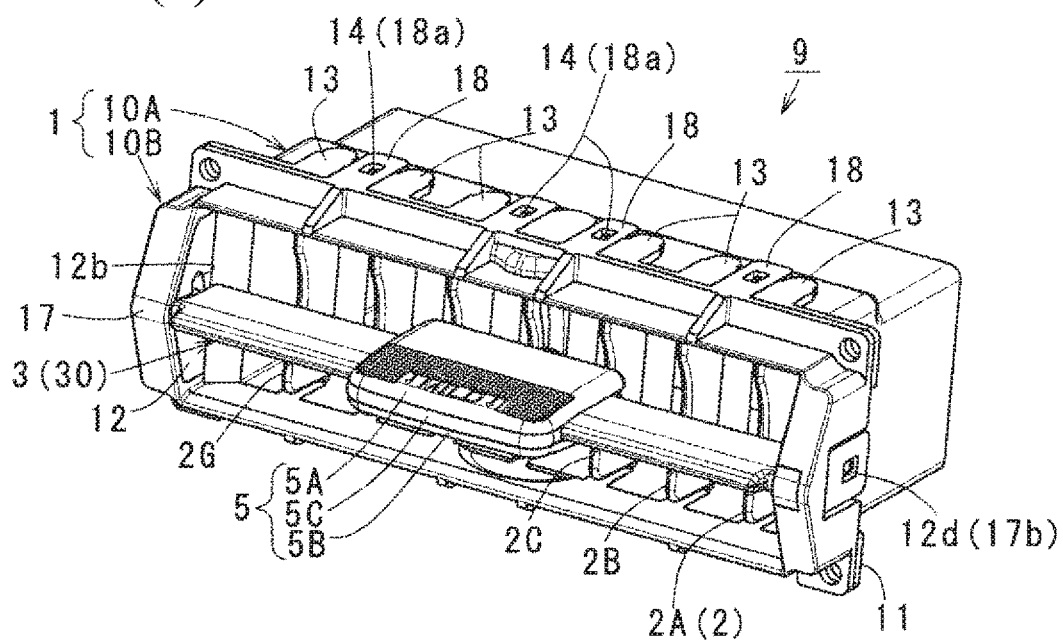

Hereinafter, embodiments of the present invention will be explained with reference to the attached drawings. In the explanation, after a structure and an operation of the first embodiment shown in FIG. 1(a) to FIG. 10(d) are described in detail, changes in a second embodiment shown in FIG. 11 to FIG. 15(b) will be described.

(Structure of the First Embodiment) As shown in FIGS. 1(a) and 1(b), FIG. 7, and FIG. 8, a wind direction adjustment device 9 comprises a case 1 set in such a way so as to blow out air to an outside from an inside; a plurality of fins 2A to 2G (2) supported in a pivotally turnable manner with respect to top and bottom concave portions 13 and 15 forming bearing first support portions facing at top and bottom faces near a front-side opening inside the case 1; a horizontal-type fin 3 supported in the pivotally turnable manner with respect to bearing second support portions 12 facing at right and left near a front opening inside the case 1; a link mechanism 6 associating two or more of the fins among respective fins 2A to 2G; and a slider 4 and an operation knob 5 assembled to the horizontal-type fin 3.

In essential parts of the wind direction adjustment device 9, the knob 5 is supported at the horizontal-type fin 3 through the slider 4, and can move to front and back and to right and left in a state wherein the knob 5 is connected to an intermediate fin 2D among the plurality of fins 2. Also, the link mechanism 6 includes two first links 6B and 6C turnably connecting respectively the intermediate fin 2D, and the first fins 2C and 2E placed on both adjacent sides of the intermediate fin 2D; and further two second links 6A and 6D for associating or synchronizing the second fins 2B and 2F placed on sides opposite to the intermediate fin 2D, and the third fins 2A and 2G placed outside the second fins 2B and 2F among both adjacent sides of the first fins 2C and 2E as the plurality of fins 2, the second fins 2B and 2F and the third fins 2A and 2G, with or to the first fins 2C and 2E. Hereinafter, the aforementioned detailed portions will be clarified.

Incidentally, as for materials of each member, a main member 10A and a front frame 10B forming the case 1; the horizontal-type fin 3; the respective fins 2A to 2G forming the fins 2; the respective links 6A to 6D forming the link mechanism 6; and an upper knob 5A and a lower knob 5B forming the knob 5 are all resin articles; however, they may be made of a material other than resin as well.

Figure 7:
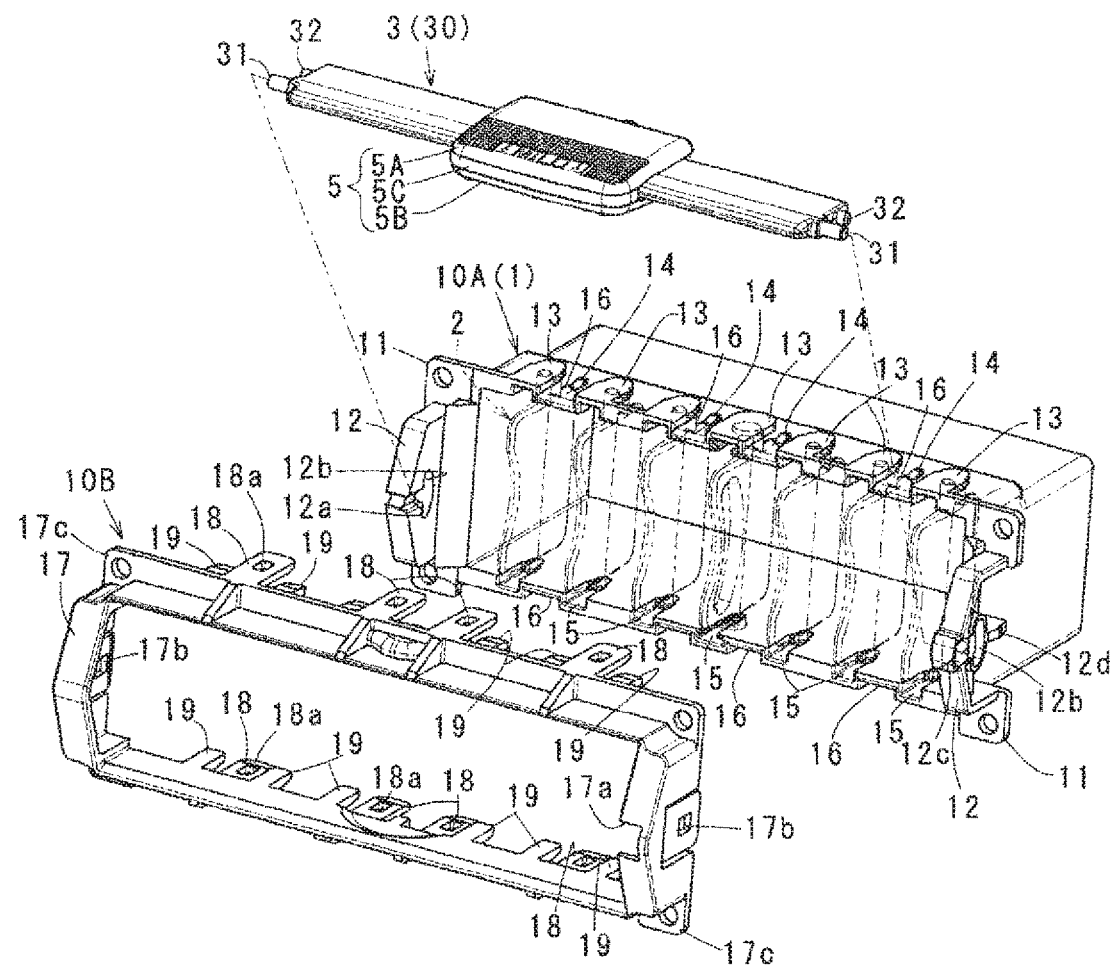
FIG. 7 is a perspective view showing a case structure, the horizontal-type fin, and the like of the wind direction adjustment device.

First, as shown in FIG. 7, in the case 1, an inner space thereof is divided by the main member 10A having a substantially cylindrical shape and the front frame 10B which is a decorative frame mounted on a front side of the main member 10A. The main member 10A includes attachment portions 11 with attachment holes provided at four corners of both front sides; the second support portions 12 projecting on both front sides and forming shaft holes 12a on the front side and arc grooves 12b on a back side; a projection 12c provided on one front side of the second support portions 12; engagement claws 12d provided on a backward side of the respective second support portions 12; a plurality of top concave portions 13 and bottom concave portions 15 provided to face at the top and bottom faces on the front side and forming the respective first support portions; a total of four (a total of eight on the top and bottom faces) partition portions 16 located on right and left and a middle between the top concave portions 13 and between the bottom concave portions 15; and engagement claws 14 provided in the respective partition portions 16.

Among those, the shaft holes 12a and the arc grooves 12b on both sides face each other. The arc groove 12b has a gentle arc shape around the shaft hole 12a. The top concave portions 13 and the bottom concave portions 15 have a simple groove shape having a predetermined length except for the middle of the right and left of the top concave portions 13 and the bottom concave portions 15, and form a shaft hole by fitting corresponding piece portions 19 of the front frame 10B as described later. In contrast, the top concave portion 13 and the bottom concave portion 15 located in the middle of the right and left are formed in a dovetail groove shape wherein a shaft portion 20 with a flange 20a of the later-described intermediate fin 2D can move to front and back.

The front frame 10B is a member fringing the front side of the main member 10A, and includes front plate portions 17 provided in front of both side portions, and dividing a space receiving the second support portion 12 between the front plate portions 17 and side faces; an opening 17a provided in one of the front plate portions 17, and fitting into the projection 12c; engagement holes 17b provided to face each other on both side faces and engaging the corresponding engagement claws 12d; a plurality of piece portions 18 provided at top and bottom side portions, and disposed in the partition portion 16 between the top concave portions 13, or in the partition portion 16 between the bottom concave portions 15; engagement holes 18a provided in the respective piece portions 18 and engaging the aforementioned engagement claws 14; a plurality of projections 19 fitting into the top concave portions 13 and the bottom concave portions 15; and an attachment portion 17c with an attachment hole superimposed on the aforementioned attachment portion 11.

In the aforementioned main member 10A, in a state wherein the fins 2 (2A to 2G) are connected relative to the top concave portions 13 and the bottom concave portions 15 by the link mechanism 6 in advance, the fins 2 (2A to 2G) are supported in the pivotally turnable manner with respect to the top concave portions 13 and the bottom concave portions 15, and the horizontal-type fin 3 is supported in the pivotally turnable manner with respect to the shaft holes 12a and the arc grooves 12b. From that state, the front frame 10B is assembled to the main member 10A. In the front frame 10B and the main member 10A, the respective piece portions 18 are disposed in the corresponding partition portions 16 on a main member side, and the front frame 10B and the main member 10A become the case 1 as an integrated article by an engagement between the engagement claws 14 and the engagement holes 18a, and an engagement of the engagement claws 12d on the main member side relative to the engagement holes 17b, so that simultaneously, the wind direction adjustment device 9 is completed. Incidentally, the case 1 is mounted on an installation portion of a vehicle and the like using the attachment portions 17c and 11. In a mounting state, the case 1 opens in a front-and-back direction of a car body, and a front frame 10B side becomes an air outlet, and the back side of the main member 10A becomes an air inlet.

The fins 2A to 2G include shaft portions 20 located on top and bottom end faces, and projecting respectively on a coaxial line approximately at a middle in a plate width direction; and shaft portions 21 located on the top end face, and projecting at the back side more than the shaft portions 20. The respective shaft portions 20 are formed long approximately for a thickness of the later-described links 6A to 6D compared to the shaft portions 21. Also, among the respective shaft portions 20, the top and bottom shaft portions 20 of the fins 2A to 2C and 2E to 2G are formed in a simple column shape. In contrast, the respective top and bottom shaft portions 20 of the intermediate fin 2D have the flanges 20a, and are supported to be movable to front and back along the dovetail groove shape of the aforementioned corresponding top concave portions 13 and bottom concave portions 15.

Also, the fins 2A to 2G are operated to be connected by the four links 6A to 6D forming the link mechanism 6. In this example, the intermediate fin 2D positioned in a middle of the right and left and the first fins 2C and 2E disposed on both adjacent sides of the intermediate fin 2D, are connected turnably by the two first links 6B and 6C. Also, one first fin 2C, the second fin 2B located outside the first fin 2C, and the third fin 2A located outside the second fin 2B are connected turnably by the second link 6A. Also, the other first fin 2E, the second fin 2F located outside the first fin 2E, and the third fin 2G located outside the second fin 2F are connected turnably by the second link 6D. Furthermore, in the intermediate fin 2D, there is provided an arc groove 23a located on a front side in the plate width direction and provided in an up-and-down direction, and a portion between the arc groove 23a and a front edge portion becomes a graspable piece portion 23. Incidentally, a front edge side of the fins 2A to 2G is formed in an arc shape so as to allow the horizontal-type fin 3 to turn.

Specifically, the first links 6B and 6C include shaft holes 7 and 7 provided on both end sides. The second links 6A and 6D are made longer than the first links 6B and 6C, and include three shaft holes 7 respectively provided on both end sides and a middle. Also, the second links 6A and 6D include shaft portions 8 wherein corresponding end portions connected to the first link 6B or 6C are formed in an upward or a downward step, and are projected in the step.

Then, in the first link 6C, the shaft hole 7 on one end side fits into the shaft portion 21 of the intermediate fin 2D, and the shaft hole 7 on the other end side fits into the shaft portion 8 of the second link 6D. In the first link 6B, the shaft hole 7 on one end side fits into the shaft portion 8 of the second link 6A, and the shaft hole 7 on the other end side fits into the shaft portion 21 of the intermediate fin 2D. Also, in the second link 6A, the shaft hole 7 on one end side fits into the shaft portion 21 of the third fin 2A; the shaft hole 7 on the other end side fits into the shaft portion 21 of the first fin 2C; the shaft hole 7 in the middle fits into the shaft portion 21 of the second fin 2B, and the shaft portion 8 on one end side fits into the shaft hole 7 of the first link 6B. In the other second link 6D, the shaft hole 7 on one end side fits into the shaft portion 21 of the third fin 2G; the shaft hole 7 on the other end side fits into the shaft portion 21 of the first fin 2E; the shaft hole 7 in the middle fits into the shaft portion 21 of the second fin 2F, and the shaft portion 8 on the other end side fits into the shaft hole 7 of the first link 6C. However, a connection between the second link 6A and the first link 6B, and a connection between the second link 6D and the first link 6C may be carried out by a structure other than the aforementioned structures.

The aforementioned horizontal-type fin 3 includes shaft portions 31 and shaft portions 32 respectively projected on respective right and left end faces of a slender main member 30; a relief opening 33 located at a right-and-left intermediate portion and provided at a back side; a control portion 34 formed such that a front side of the opening 33 is formed one step thicker; and guide grooves 35 and 35 located on top and bottom faces, provided between the opening 33 and the control portion 34, and extending to right and left. The respective shaft portions 31 are formed longer than the shaft portions 32. In the control portion 34, there is provided a hole portion 36. Incidentally, in the hole portion 36, there is mounted an elastic member (not shown in the drawings) as needed. The elastic member is a member moderately pressing the later-described operation knob 5 so as to prevent the knob 5 from wobbling due to vibrations and the like.

Then, the horizontal-type fin 3 fits into the shaft holes 12a wherein the shaft portions 31 on both sides correspond, and fits into the arc grooves 12b wherein the shaft portions 32 on both sides correspond relative to the second support portions 12 and 12. Consequently, in the horizontal-type fin 3, the back side in the plate width direction is turnable in an up-and-down direction only at a predetermined angle according to the arc groove 12b as a supporting point of the shaft portion 31 on the front side.

Also, in the horizontal-type fin 3, there is assembled the operation knob 5 to be movable to front and back only for a predetermined distance, and movable horizontally to right and left only for a predetermined distance through the slider 4. Namely, as shown in FIGS. 9(a) to 9(d), the slider 4 is formed in an approximately U shape sandwiching the main member 30 therebetween in a side view, and includes an approximately rectangular main member 40 forming a center portion, and arm portions 45 and 46 connected by maintaining gaps 44 on both sides of the main member 40. Then, the slider 4 is slidably assembled relative to the horizontal-type fin 3 in a right-and-left direction, and sliding thereof is controlled within a predetermined range. The knob 5 is slidably assembled relative to the slider 4 in a front-and-back direction, and sliding thereof is controlled within a predetermined range.

Figure 9A:
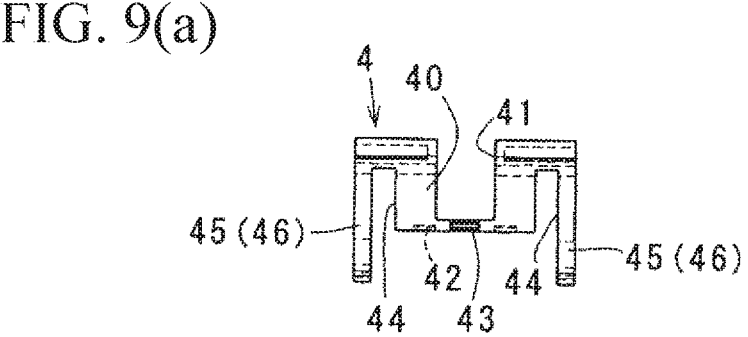
Figure 9B:
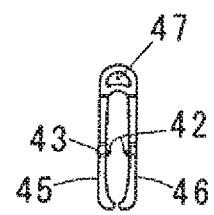
Figure 9C:
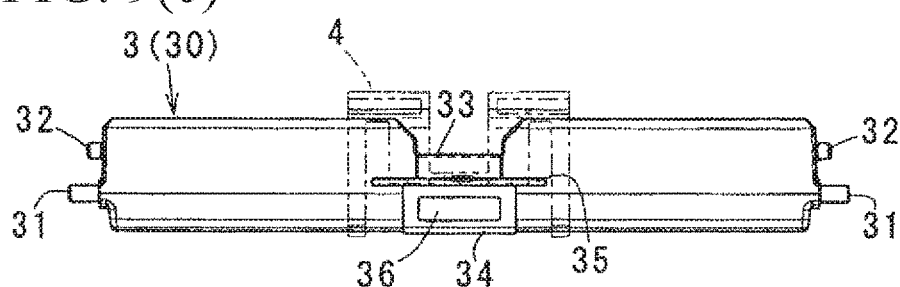
Figure 9D:
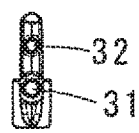
Figure 10A:
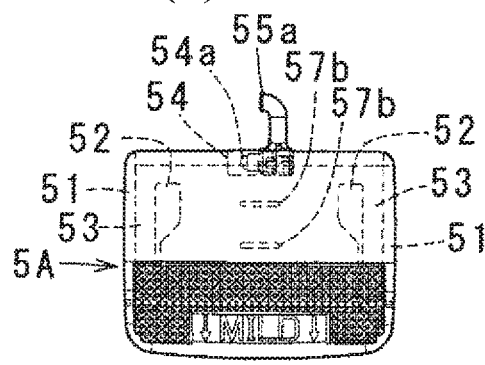
Figure 10B:
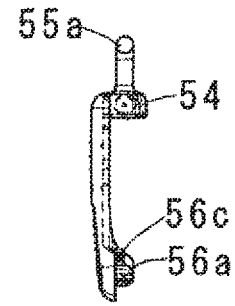
Figure 10C:
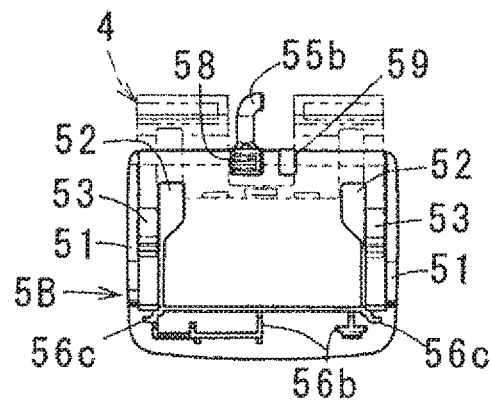
Figure 10D:
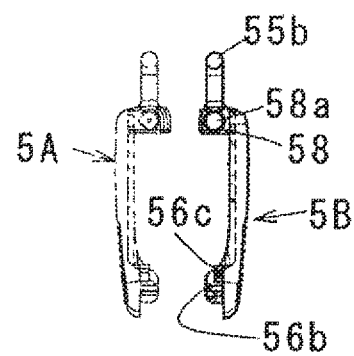

Specifically, the main member 40 clamps fin portions between both ends of the control portion 34 from one side in a longitudinal direction of the horizontal-type fin 3. In the main member 40, there are provided an opening 41 notched until just before a tip from an intermediate side of the U shape; a pair of convex portions 42 and 42 respectively projecting at a tip of a facing inner face; and a stopper 43 projecting at a tip of an upper face. As shown in FIG. 4(b), the opening 41 is a portion for releasing one portion (for example, projections 54, 58, and 59 or piece portions 55a and 55b) of the later-described knob 5. The respective convex portions 42 slidably fit into the guide grooves 35, and control a right-and-left movement amount of the slider 4 relative to the horizontal-type fin 3. The stopper 43 can control a front-and-back movement of the knob 5 to a predetermined distance. On the other hand, in the arm portions 45 and 46, tips thereof are formed to be curved inward, and as shown in FIG. 9(c), in a state wherein the main member 30 is disposed inward, the arm portions 45 and 46 are slidably caught in a corresponding edge portion of the main member 30, and are assembled in such a way so as not to be unexpectedly detached from the main member 30.

The knob 5 is formed by the upper knob 5A and the lower knob 5B sandwiching the horizontal-type fin 3 and the slider 4 from top and bottom; and a decorative knob 5C located between both knobs 5A and 5B, and mounted on a front side. Also, the knob 5 can move to right and left together with the slider 4 relative to the horizontal-type fin 3, and can move to front and back independently relative to the slider 4.

Figure 8:
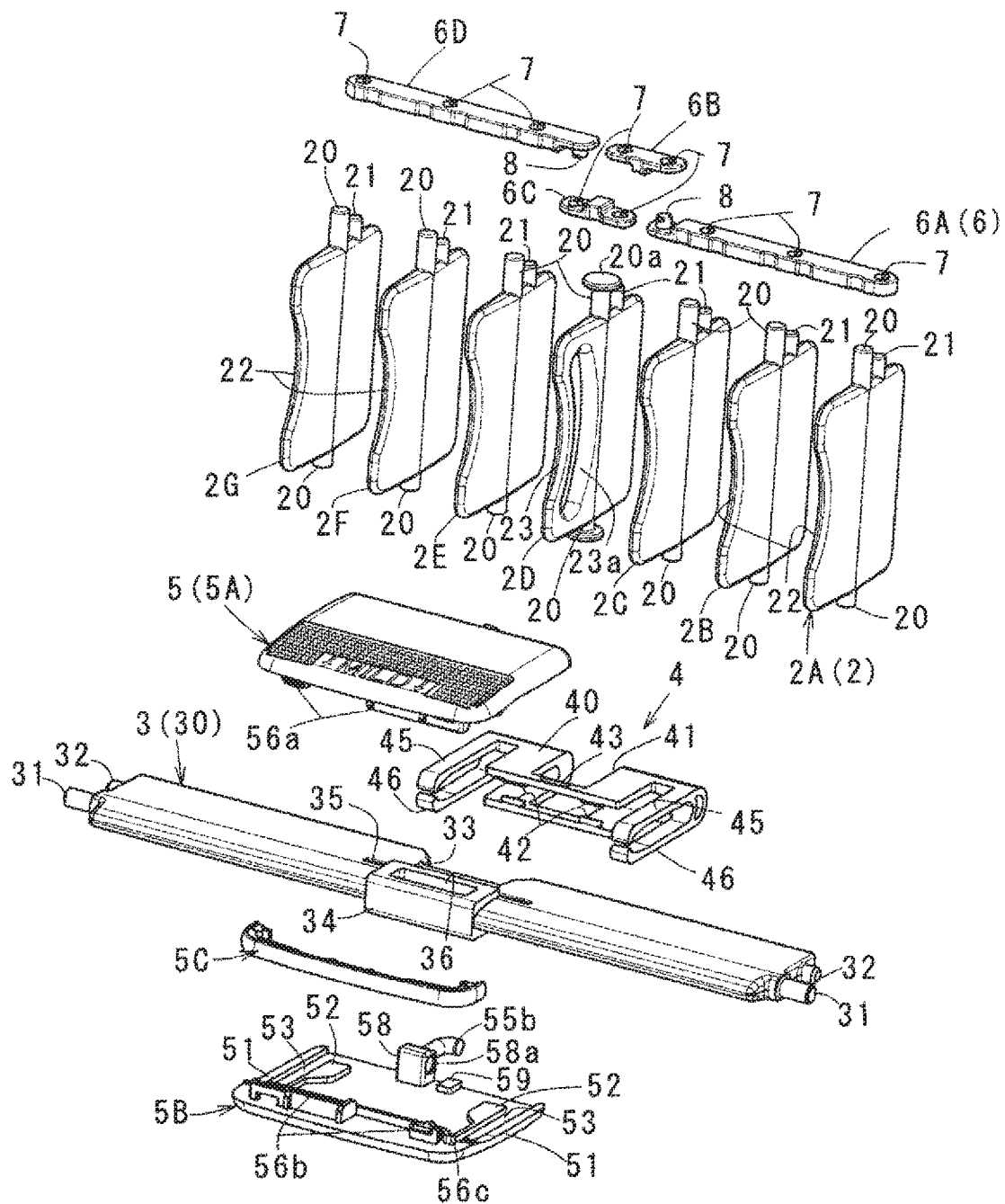
FIG. 8 is a schematic exploded perspective view showing a relationship among members forming the wind direction adjustment device.

Here, as shown in FIGS. 10(a) to 10(d), in the upper and lower knobs 5A and 5B, as for an inner face shape, there are provided edge portions 51 on both sides; projecting portions 52 projecting in parallel to the respective edge portions 51 and dividing guide grooves 53 extending to front and back therebetween; latching walls 56a and 56b projecting at a tip side, and engageable with the decorative knob 5C; claw portions 56c and 56c projecting on both sides of the latching walls 56a and 56b; and the projection 54 or 58 provided on a back end side and connected to each other. The projection 54 is provided on a left side slightly more than a middle of the right and left of the upper knob 5A, and includes a shaft portion 54a projecting on a left end face, and the piece portion 55a projecting from an upper face side. The projection 58 is provided on a right side slightly more than a middle of the right and left of the lower knob 5B in the drawings, and as shown in FIG. 8, includes an engagement hole 58a provided on a right end face, and the piece portion 55b projecting from the upper face side. Additionally, the upper knob 5A includes two abutment walls 57b and 57b provided to project between the projection 54 and the latching wall 56a. The respective abutment walls 57b and 57b face each other at front and back by maintaining a predetermined interval, and abut against the stopper 43 so as to control a front-and-back movement amount of the knob 5.

The aforementioned upper and lower knobs 5A and 5B are superimposed in such a way so as to interpose the slider 4 from top and bottom in a state wherein the shaft portion 54a is engaged with the engagement hole 58a after the slider 4 is assembled to the horizontal-type fin 3. As for procedures, for example, the decorative knob 5C is attached to the lower knob 5B in a state wherein a lower side of the decorative knob is locked in the claw portions 56c on both sides and the like. After that, the upper and lower knobs 5A and 5B are superimposed in such a way so as to interpose the slider 4 assembled to the main member 30 from top and bottom. Then, the decorative knob 5C is attached to the upper knob 5A in a state wherein an upper side of the decorative knob is locked in the claw portions 56c on both sides and the like, so that the upper and lower knobs 5A and 5B become an integrated article through the decorative knob 5C.

Figure 3A:
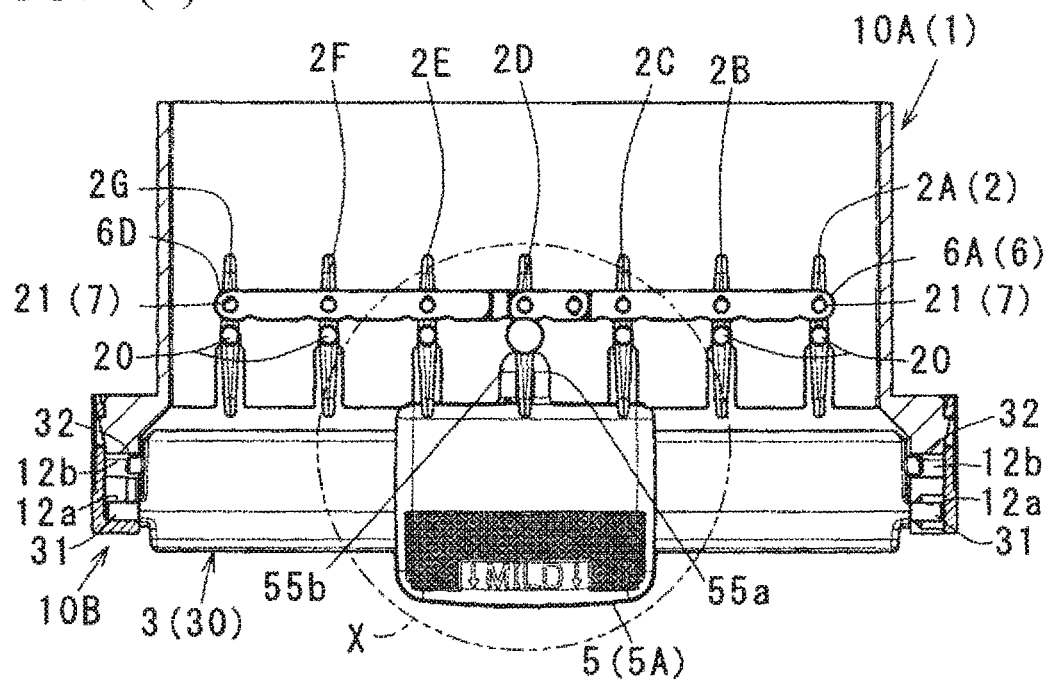
Figure 3B:
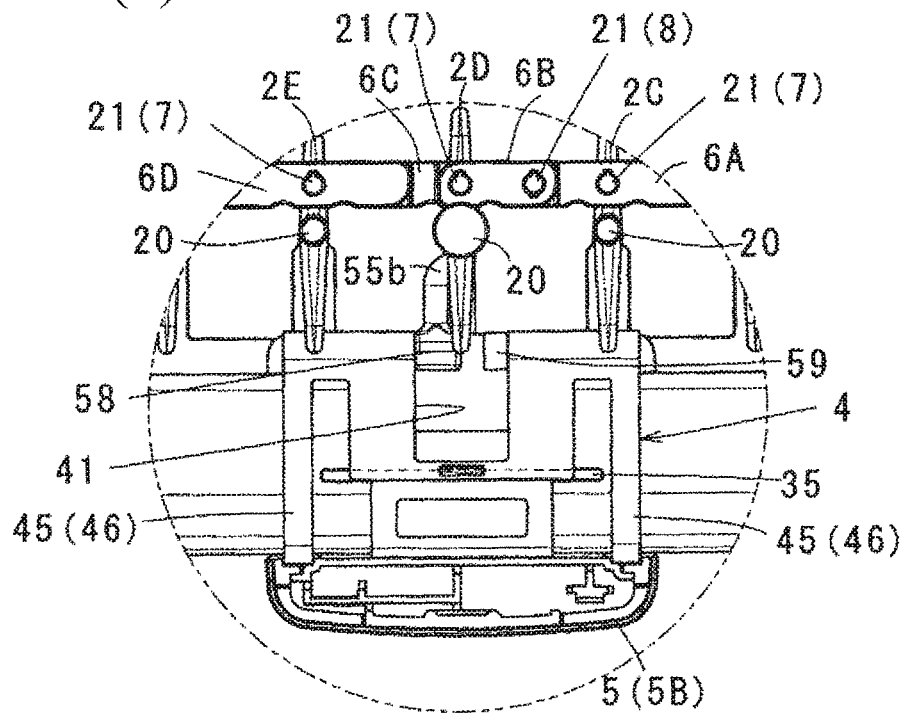

In an attachment state, as shown in FIGS. 3(a) and 3(b), the respective piece portions 55a and 55b of the upper and lower knobs are disposed inside the arc groove 23a of the intermediate fin 2D. Consequently, the knob 5 restrains the piece portion 23 of the intermediate fin 2D inside the respective piece portions 55a and 55b, and by a restraining aspect thereof, the knob 5 is connected or operated to be connected to the intermediate fin 2D. Then, the knob 5 can move in the front-and-back direction relative to the slider 4 in a state wherein the upper and lower guide grooves 53 fit into the arm portions 45 and 46. The front-and-back movement amount of the knob 5 corresponds to a size between the aforementioned abutment walls 57b.

(Operations) Hereinafter, the main operations of the wind direction adjustment device made as mentioned above will be clarified.

(1) FIGS. 2(a) and 2(b) and FIGS. 3(a) and 3(b) show a state of the parallel air-blowing mode wherein the respective fins 2A to 2G become approximately parallel to one another. In this state, the respective links 6A to 6D are linearly disposed, and the knob 5 is disposed in an approximately middle of the right and left of the horizontal-type fin 3. Furthermore, the projections 54 and 58 and the projection 59 of the respective knobs are disposed inside the opening 41 of the slider. Then, in the parallel air-blowing mode, the slider 4 is disposed in a middle of the right and left of the guide groove 35 of the horizontal-type fin, and the knob 5 is disposed in a middle of the right and left of the horizontal-type fin 3, i.e., an initial or usual position in FIGS. 3(a) and (b).

Figure 4A:
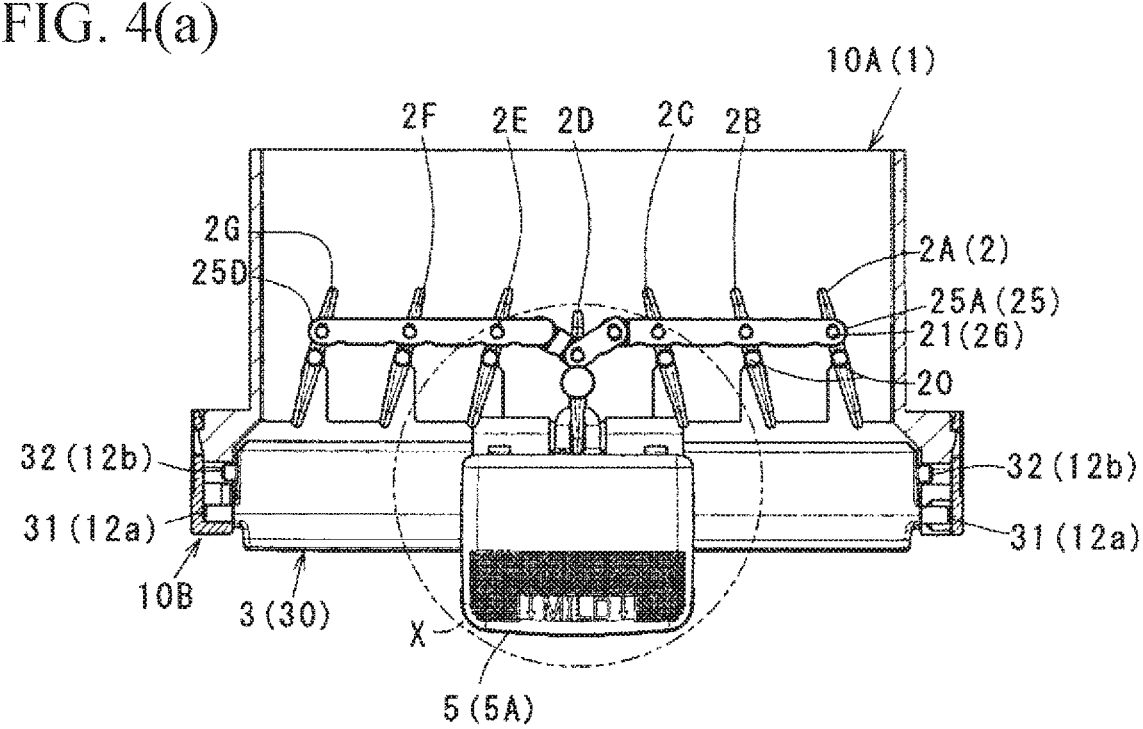
Figure 4B:
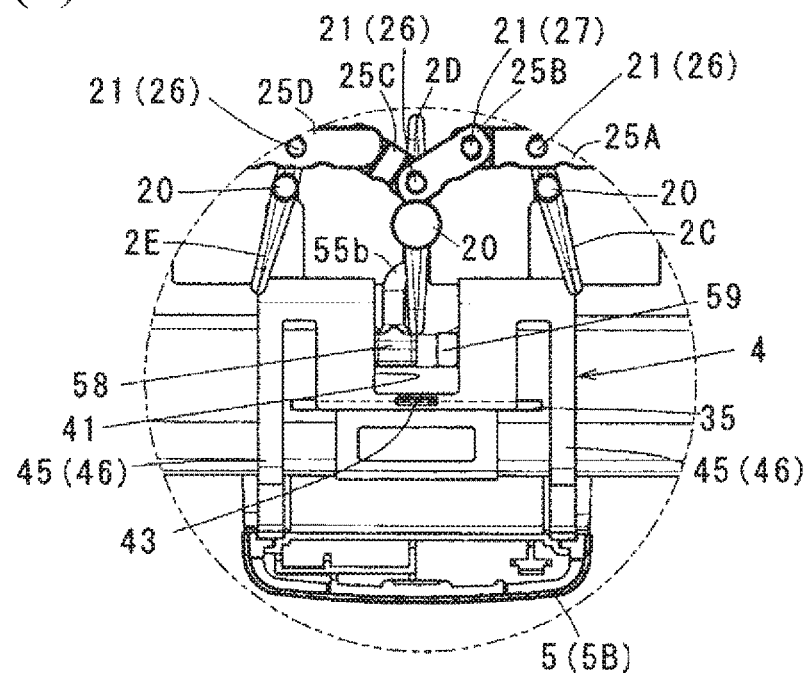

(2) FIGS. 4(a) and 4(b) show a state of the dispersive air-blowing mode wherein the knob 5 is pulled as shown in FIG. 4(b) to maximum from the state of the parallel air-blowing mode so that the fins 2A to 2C, and the fins 2E to 2G are turned in the opposite directions. Namely, the knob 5 is moved at a foremost position which is a just-in-front direction relative to the slider 4 assembled to the horizontal-type fin 3 from the aforementioned usual position, i.e., until the abutment wall 57b on a side near the projection 54 shown in FIG. 10(a) abuts against the stopper 43 of the slider. Then, the intermediate fin 2D is pulled by the knob 5 so as to move forward along the dovetail groove shape of the concave portions 13 and 15. Due to the forward movement of the intermediate fin 2D, the piece portion 23 or the front side enters into the opening 41 to be released by maintaining an initial approximately parallel state. In synchronization with that, the other fins 2A to 2C are turned through the first link 6B and the second link 6A, and the fins 2E to 2G are turned through the first link 6C and the second link 6D, respectively in the directions opposite to each other so as to be switched to the dispersive air-blowing mode. In that case, a turning angle of the fins 2A to 2C, or the fins 2E to 2G becomes an angle in proportion to a pulling quantity of the knob 5 so as to obtain various dispersive air-blowing aspects.

(3) In a case of returning to the parallel air-blowing mode from the dispersive air-blowing mode again, when the knob 5 is pinched to operate to push, the intermediate fin 2D moves up to the original usual position. In synchronization with that, the other fins 2A to 2C and 2E to 2G are switched to the parallel air-blowing mode which is the state approximately parallel to the intermediate fin 2D through the corresponding links 6A to 6D as well.

Figure 5A:
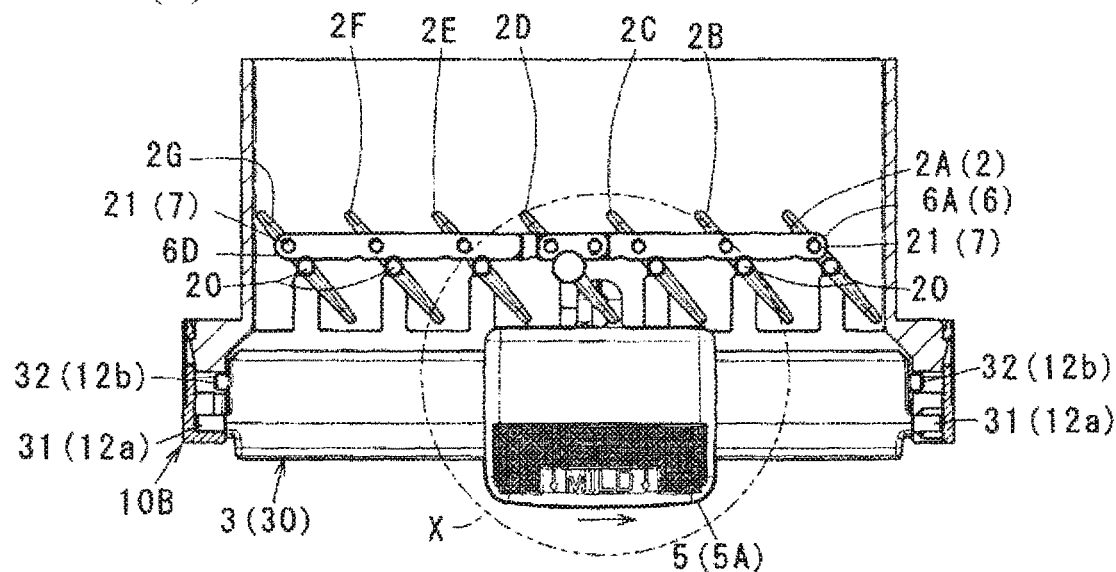
Figure 5B:
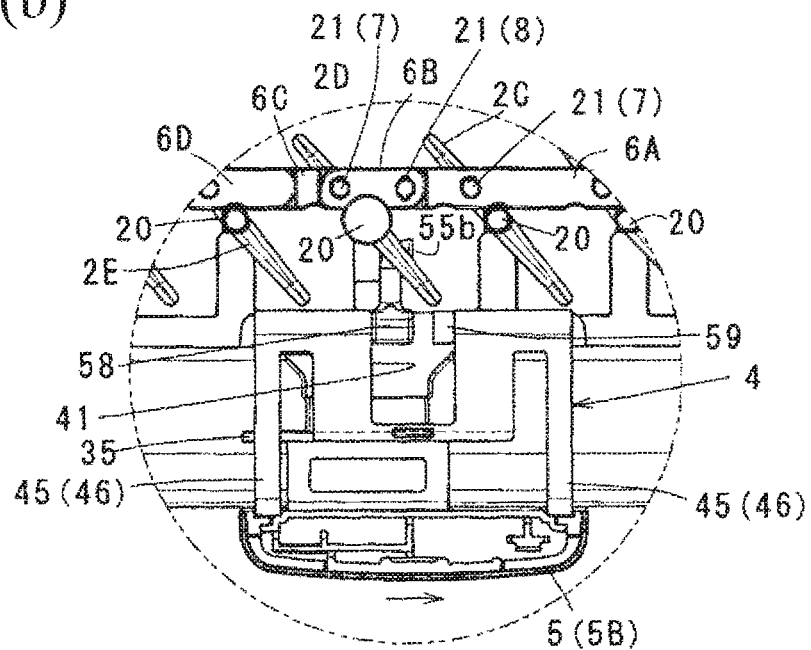

(4) FIGS. 5(a) and 5(b) show a state of an inclined air-blowing mode wherein the knob 5 is moved horizontally to a maximum in an arrow direction in FIG. 5(b) from the state of the parallel air-blowing mode so that all fins 2A to 2G are turned in an approximately same direction to be inclined. Namely, in the state of the parallel air-blowing mode which is the usual position, when the knob 5 is moved to a right or left side which is a horizontal direction relative to the horizontal-type fin 3 together with the slider 4, i.e., until the convex portion 42 abuts against a corresponding groove end of the guide groove 35, the intermediate fin 2D is turned in a direction corresponding to a moving direction of the knob 5 as a supporting point of the upper and lower shaft portions 20 so as to become an inclined state which becomes non-parallel to the second support portion 12. In synchronization with that, the other fins 2A to 2C are turned through the first link 6B and the second link 6A, and the fins 2E to 2G are turned through the first link 6C and the second link 6D, respectively in the same direction as the fin 2D so as to be switched to the inclined air-blowing mode. Incidentally, the inclined air-blowing mode can be also called as a neck-swinging air-blowing mode since each fin 2A to 2G comes to have an angle in proportion to a degree of a horizontal movement of the knob 5, or a turning degree of each fin 2.

Figure 6A:
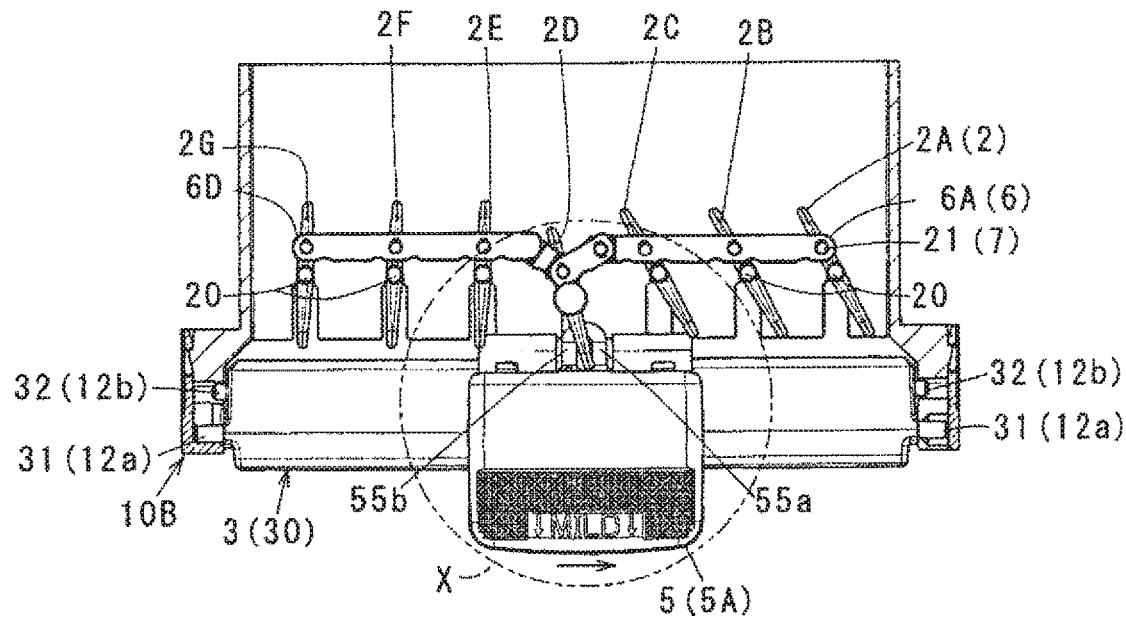
Figure 6B:
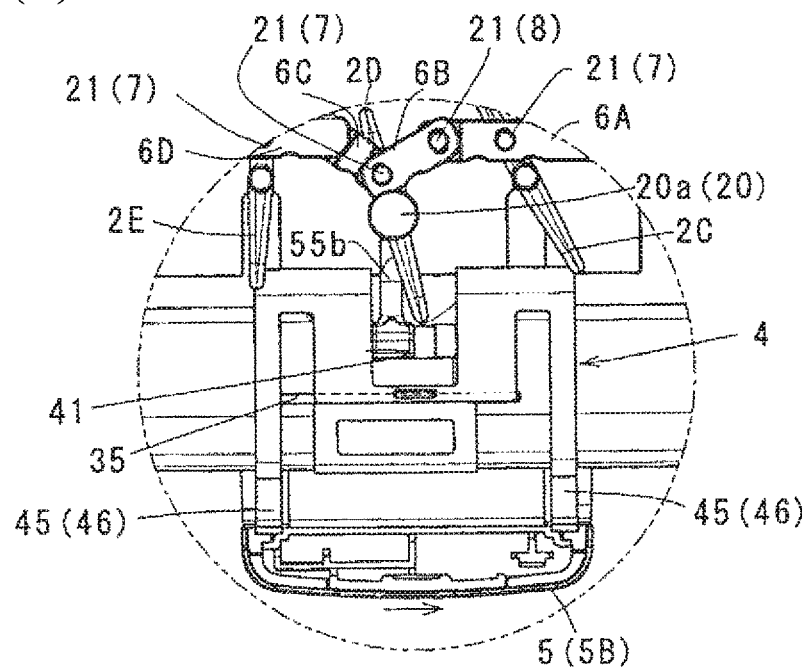

(5) FIGS. 6(a) and 6(b) show a state of a deformation dispersive air-blowing mode wherein the knob 5 is moved in an arrow direction in FIG. 6(b) through the slider 4 in a state wherein the knob 5 is pulled from the usual position from the state of the dispersive air-blowing mode in FIGS. 4(a) and 4(b), and an inclination of some of the fins 2, in this example, the fins 2E to 2G is changed, i.e., inclination angles of the fins 2E to 2G on a left side in the drawings and the fins 2A to 2C on a right side in the drawings sandwiching the intermediate fin 2D differ. Namely, in the state of the dispersive air-blowing mode, when the knob 5 is moved to the right or left side which is the horizontal direction integrally with the slider 4, i.e., until the convex portion 42 abuts against the corresponding groove end of the guide groove 35, the intermediate fin 2D is turned in the direction corresponding to the moving direction of the knob 5 as the supporting point of the upper and lower shaft portions 20 so as to become the inclined state from a horizontal state. At that time, in an example of FIGS. 6(a) and 6(b), the intermediate fin 2D pushes the first link 6C and the second link 6D in the same direction associated with counterclockwise turning of the intermediate fin 2D. As a result, although the fins 2D to 2G turn in the same direction through the links 6C and 6D, the fins 2A to 2C maintains the state of the dispersive air-blowing mode.

(6) In the aforementioned embodiment, the knob 5 is supported movably to the front and back and to the right and left relative to the single horizontal-type fin 3 through the slider 4 so as to simplify a support structure of the knob. Also, the knob 5 switches among the parallel air-blowing mode wherein the aforementioned fins 2 become parallel to one another; the dispersive air-blowing mode wherein two or more of the fins are turned in the directions opposite to each other; the inclined air-blowing mode wherein the fins 2 are turned in the same direction so as to be inclined all at a predetermined angle by a moving operation of the knob 5 in the horizontal direction through the slider 4 from the state of the parallel air-blowing mode; and the deformation dispersive air-blowing mode wherein some of the fins 2 turn in the same direction by the moving operation of the knob 5 in the horizontal direction through the slider 4 from the state of the dispersive air-blowing mode. Consequently, in the switching structure, by allowing consecutive switching operations by the knob 5, a switching operability of the air-blowing aspect can be simplified, so that as mentioned in the Problems to be Solved by the Invention, an air-blowing mode to be missed is eliminated and usability can be improved.

Figure 1B:
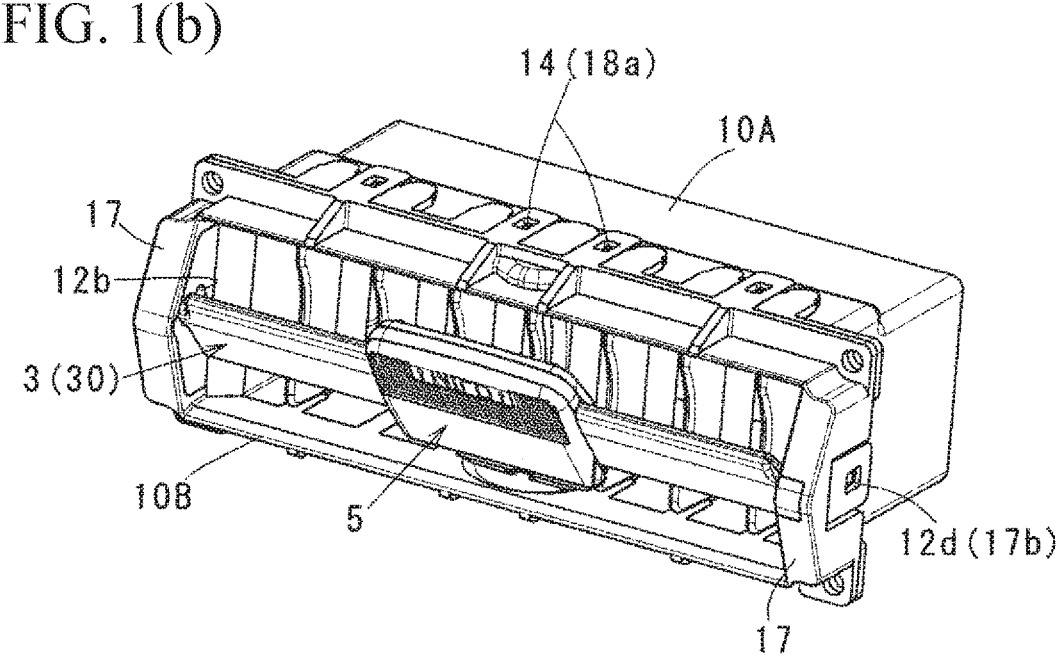
Figure 2A:
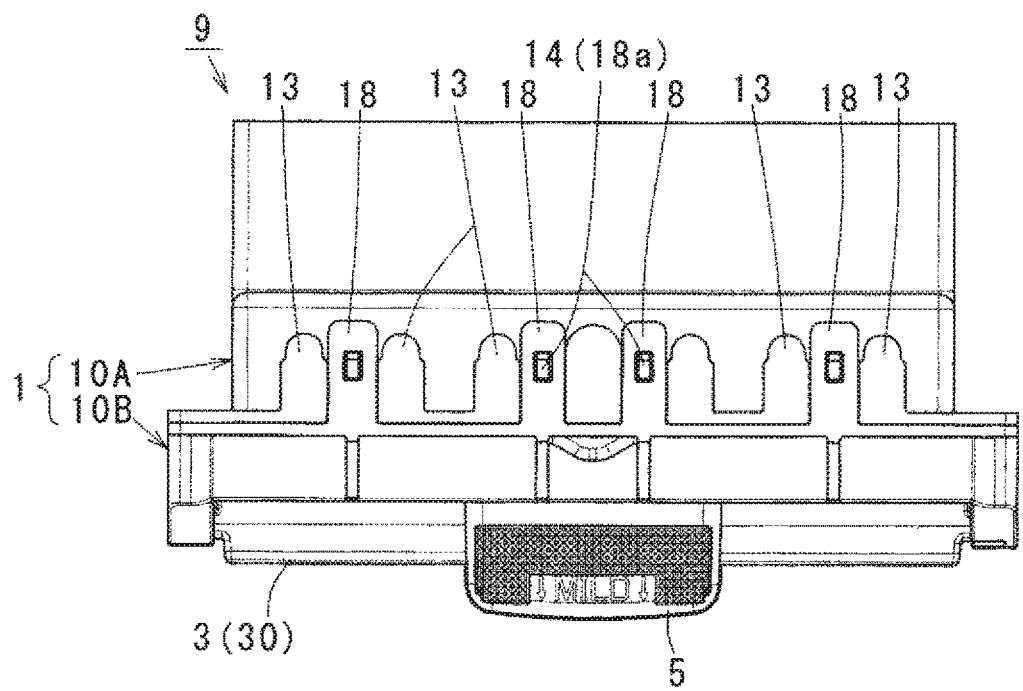
Figure 2B:
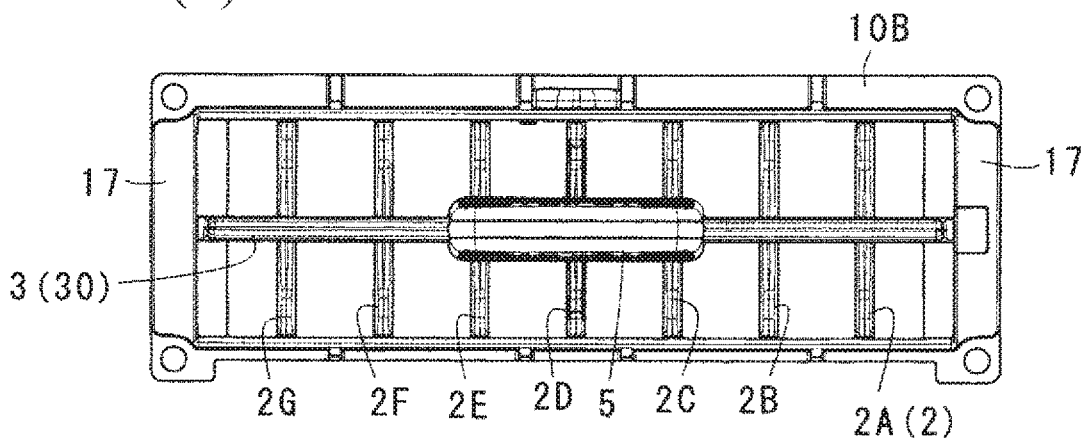
Figure 2C:
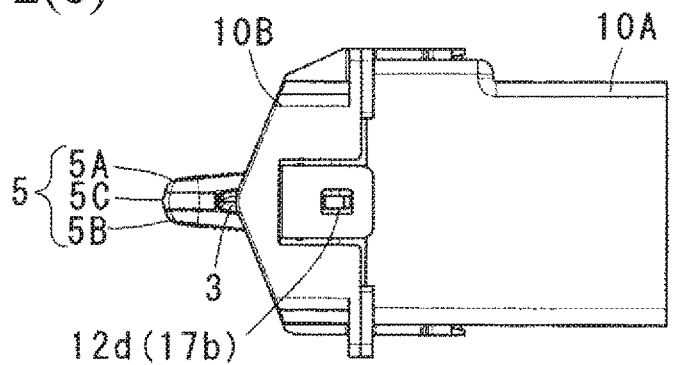

(7) Incidentally, in the aforementioned embodiment, by a turning structure of the horizontal-type fin 3 relative to the second support portion 12, as shown in FIGS. 1(a) and 1(b) as an example, the air-blowing aspect can be varied furthermore according to a position or an angle of the fin 3. Namely, FIG. 1(b) shows a state wherein the fin 3 is pushed upward in the drawing from the state in FIG. 1(a). In that case, the fin 3 is turned clockwise as the supporting point of the shaft portion 31 until the shaft portion 32 abuts against a lower end inside the arc groove 12b to be controlled relative to the second support portions 12 on both sides so as to become an upward inclined state in the drawing. When the fin 3 is pushed downward from the state in FIG. 1(a), the fin 3 comes to a state inclined in a direction opposite to FIG. 1(b).

(Structure of Second Embodiment) The wind direction adjustment device shown in FIG. 11 to FIG. 15(b) has a basic structure same as that of the wind direction adjustment device 9 of the first embodiment, and is one example wherein especially the dispersive air-blowing mode is changed so as to become a vertical diffusion from a horizontal diffusion. Consequently, in the explanation, the same symbols are assigned to the same members or portions shown in FIG. 1(a) to FIG. 10(d), and their overlapped explanations will be omitted as much as possible.

Figure 11:
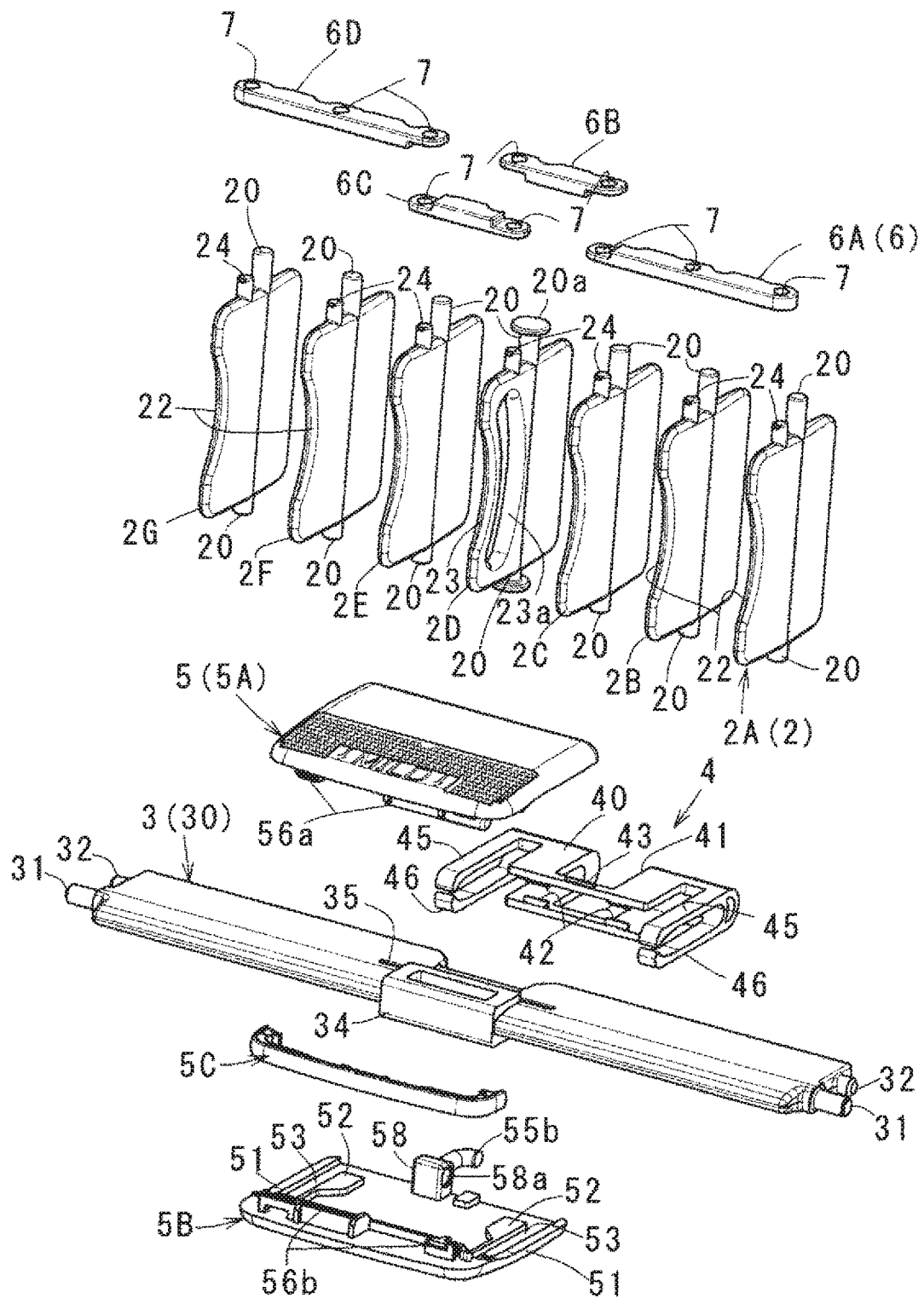
FIG. 11 is an exploded perspective view showing essential parts of the wind direction adjustment device according to a second embodiment of the present invention corresponding to FIG. 8.
Figure 12A:
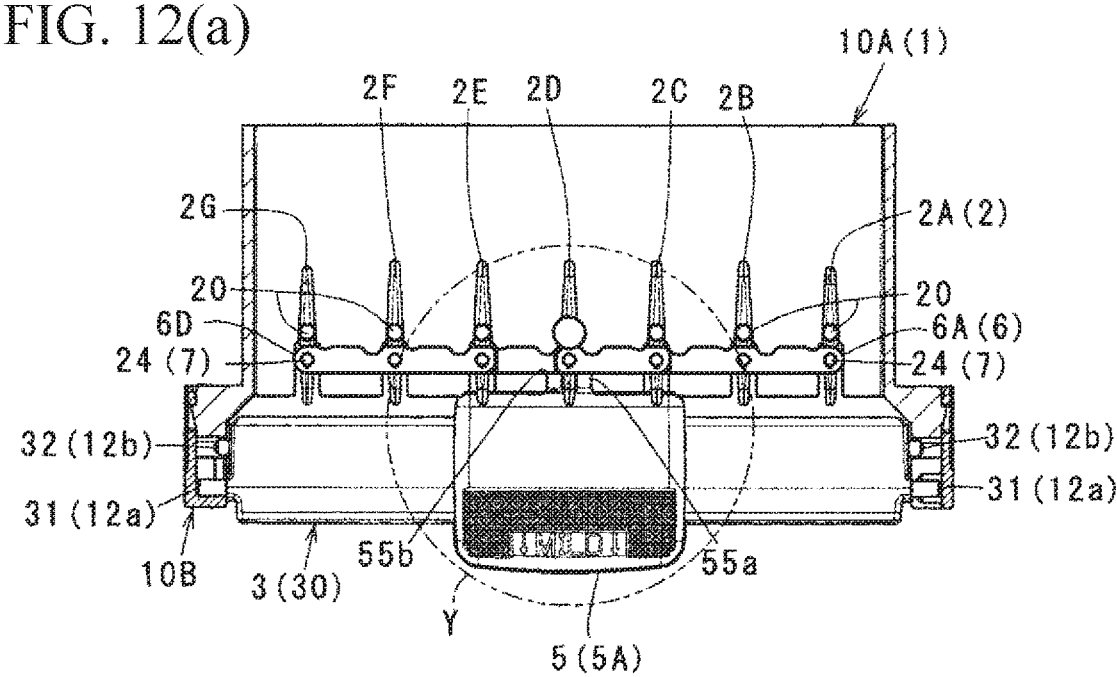
Figure 12B:
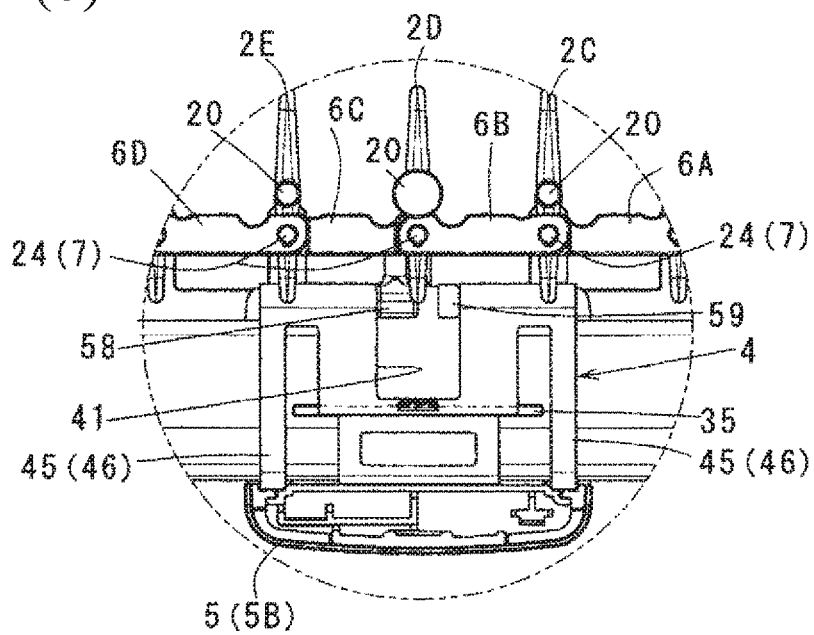

(Changes of the Structure) FIG. 11 shows essential parts of the second embodiment corresponding to FIG. 8. In this structure, with respect to the first embodiment, there are changes in that shaft portions 24 which are link shaft portions in the fins 2A to 2G (2) are provided on a front side of the shaft portions 20 which are fin shaft portions; and a connecting structure between the links forming the link mechanism 6. Among those, in the former structure, the shaft portions 24 which are the link shaft portions are provided on the front side of the shaft portions 20, so that in a state wherein the respective fins 2A to 2G are pivotally supported through the shaft portions 20 relative to the case 1 as shown in FIG. 12(*a*) to FIG. 14(*b*), the links 6A to 6D (6) are disposed on the front side of the shaft portions 20.

In the latter structure, one first link 6C fits the shaft hole 7 on one end side into the shaft portion 24 of the intermediate fin 2D, and fits the shaft hole 7 on the other end side into the shaft portion 24 of the first fin 2E. The other first link 6B fits the shaft hole 7 on one end side into the shaft portion 24 of the first fin 2C, and fits the shaft hole 7 on the other end side fits into the shaft portion 24 of the intermediate fin 2D. Also, the second link 6A fits the shaft hole 7 on one end side into the shaft portion 24 of the third fin 2A, fits the shaft hole 7 on the other end side into the shaft portion 24 of the first fin 2C, and fits the shaft hole 7 in the middle into the shaft portion 24 of the second fin 2B. The other second link 6D fits the shaft hole 7 on one end side into the shaft portion 24 of the third fin 2G, fits the shaft hole 7 on the other end side into the shaft portion 24 of the first fin 2E, and fits the shaft hole 7 in the middle into the shaft portion 24 of the second fin 2F. Namely, in this structure, compared to the first embodiment, the respective links 6A to 6D are disposed in the front side of the shaft portions 20 so as to increase a degree of freedom when the links are displaced in association with a movement of the knob 5. As a result, a connection between the links is simplified as well.

(Changes in the Operation) In the second embodiment, among the aforementioned (1) to (6) described in the first embodiment, except for the operation of (2), the operations are approximately the same. Namely, in the dispersive air-blowing mode of the first embodiment, as shown in FIGS. 4(*a*) and 4(*b*), the shaft portions 20 which are the fin shaft portions are disposed in front of the shaft portions 21 which are the link shaft portions, so that two or more of the fins 2 turn a front side outwardly to each other so as to disperse an air-blowing direction in a right-and-left direction. In short, air is blown out in such a way so as to spread in a horizontal direction.

Figure 13A:
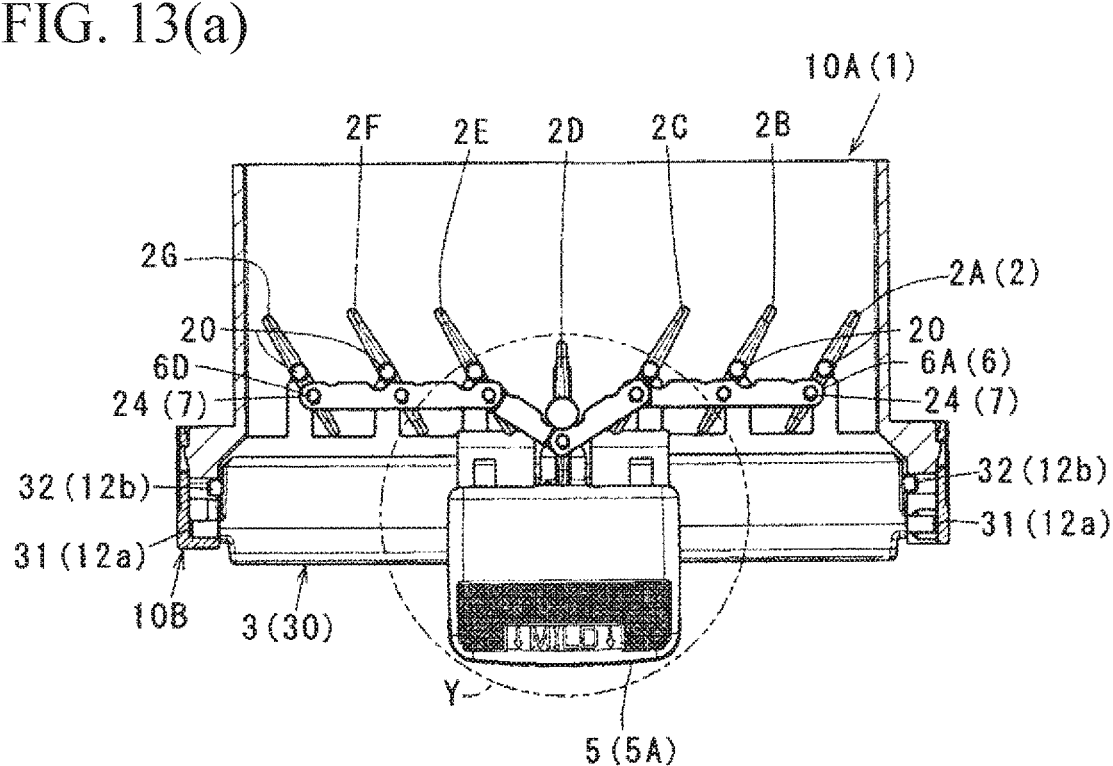
Figure 13B:
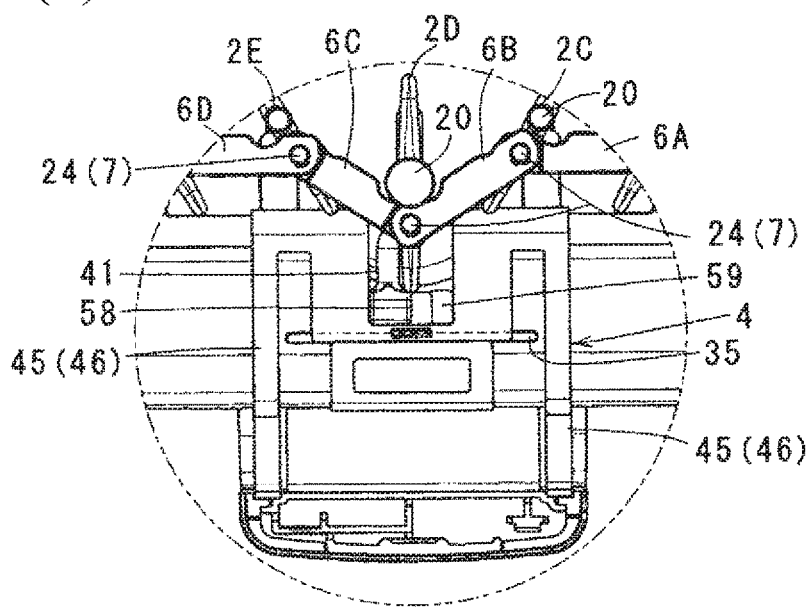
Figure 14A:
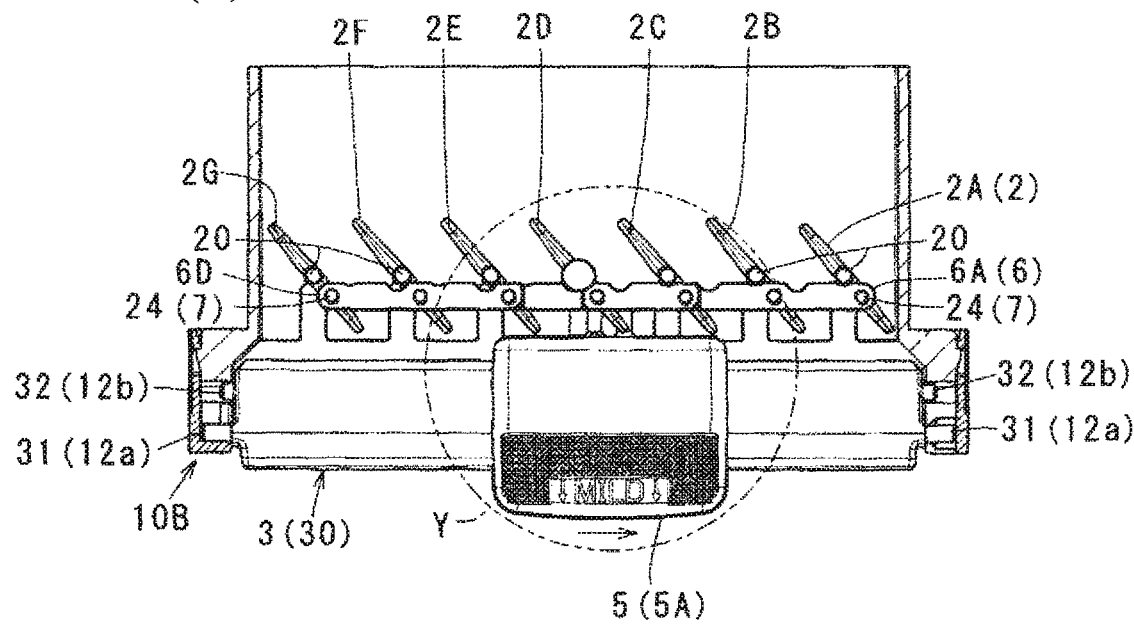
Figure 14B:
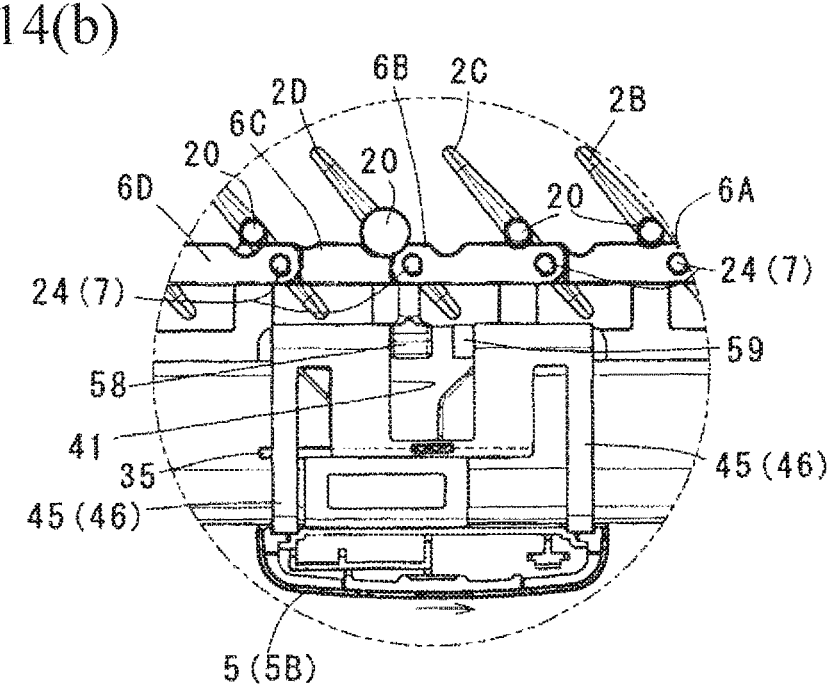
Figure 15A:
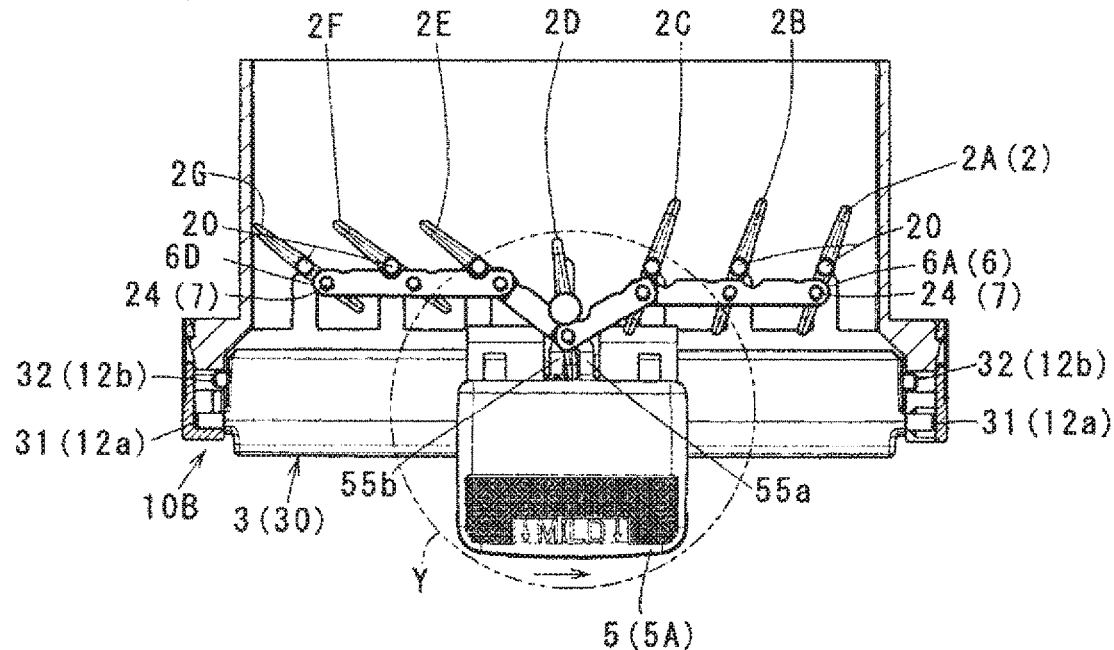
Figure 15B:
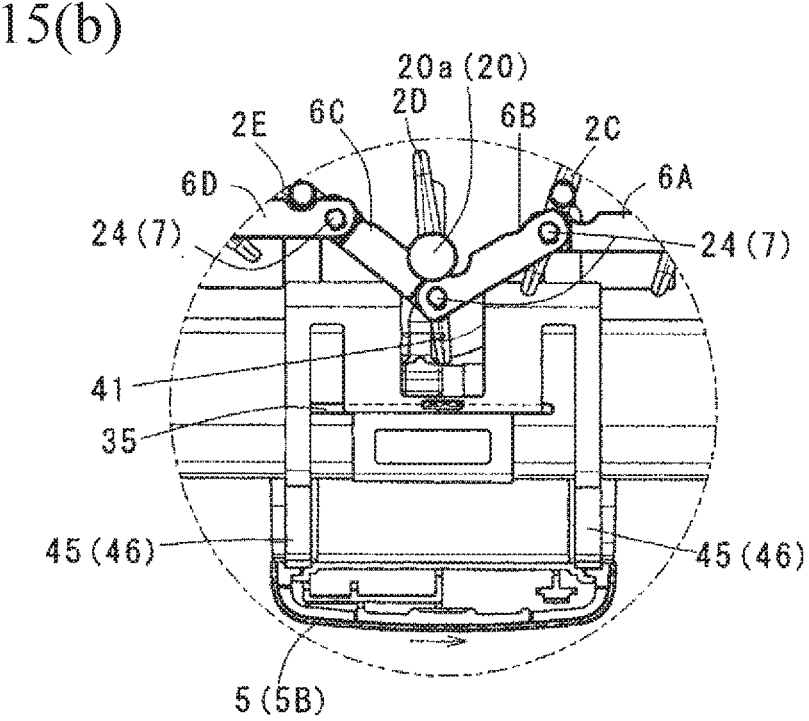
Figure 16:
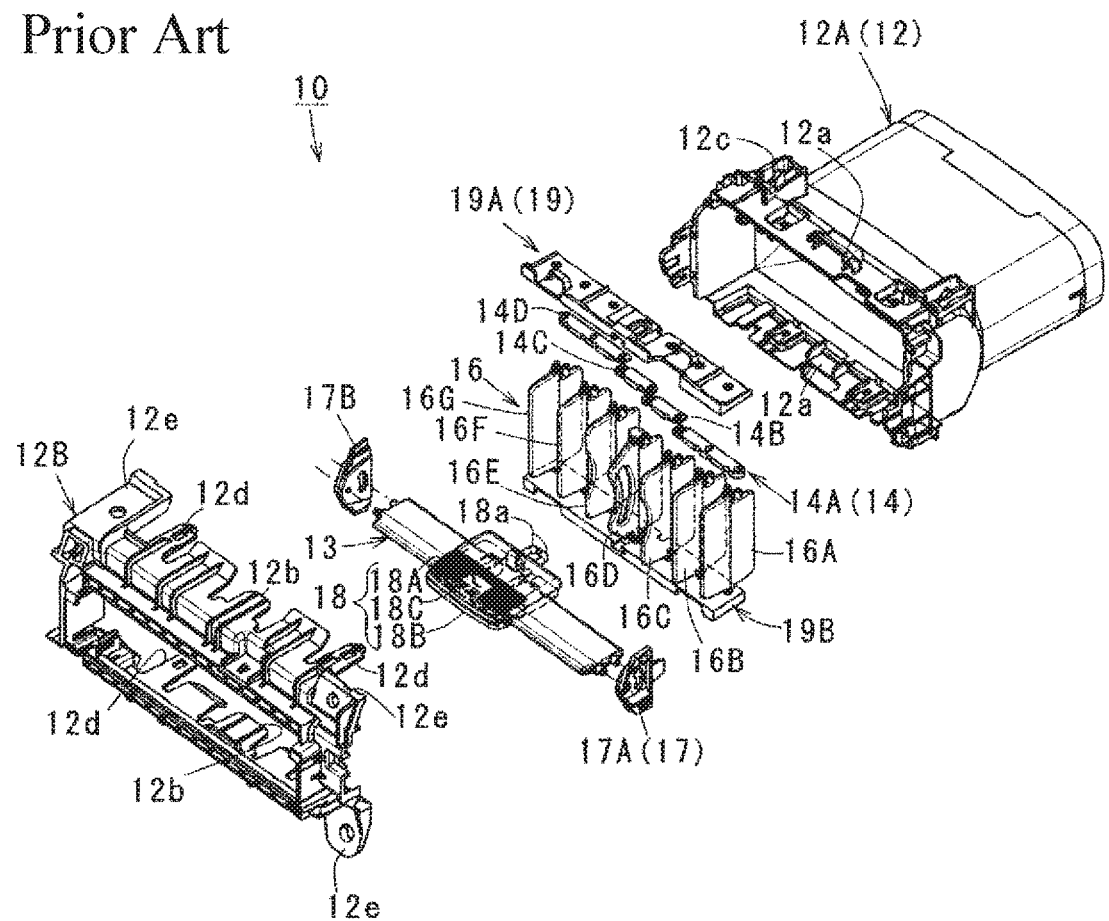
FIG. 16 is a schematic view of the wind direction adjustment device showing FIG. 10 of Patent Document 1.
Figure 17A:
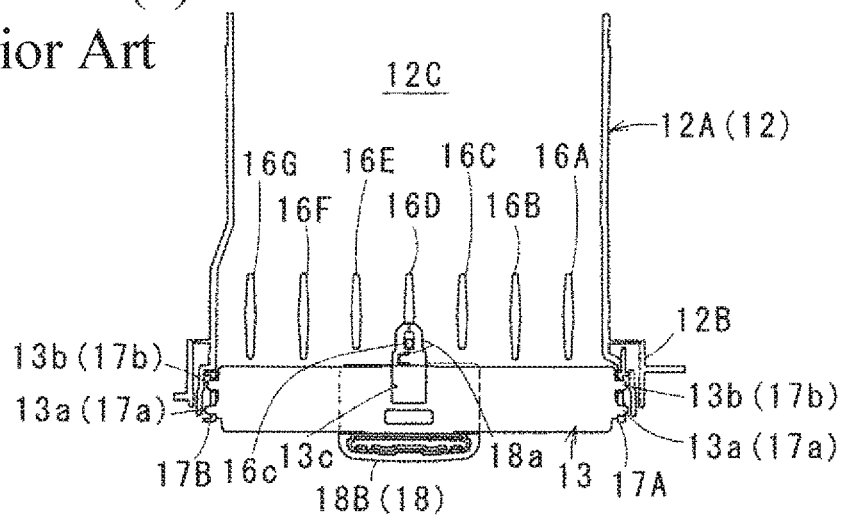
FIGS. 17(a), 17(b), and 17(c) are schematic views showing FIGS. 12(c), 13(c), and 14(c) of the Patent Document 1.
Figure 17B:
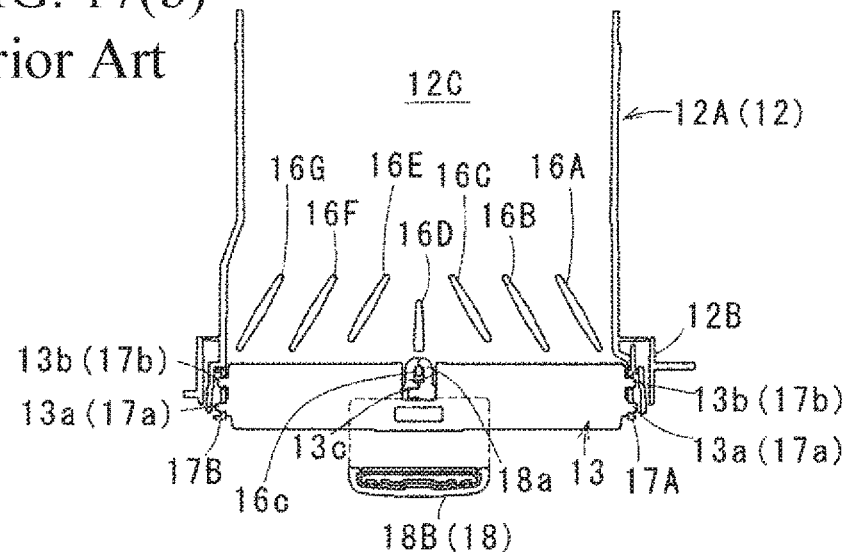
Figure 17C:
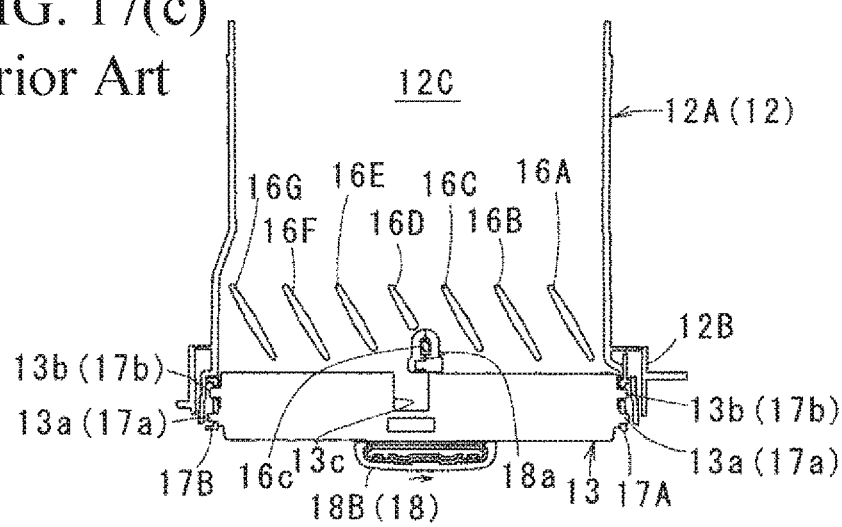

In contrast, in the dispersive air-blowing mode of the second embodiment, as shown in FIGS. 13(*a*) and 13(*b*), the shaft portions 20 which are the fin shaft portions are disposed behind the shaft portions 24 which are the link shaft portions, i.e., the shaft portions 24 are disposed in front of the shaft portions 20, so that a movement of the links 6 becomes difficult to be restricted. As a result, in two or more of the fins 2, i.e., the fins 2A to 2C on the right side in the drawings and the fins 2E to 2G on the left side in the drawings sandwiching the intermediate fin 2D, the front side turns inwardly to one another so as to face a direction of the intermediate fin 2D together, so that the air-blowing direction can be dispersed in an up-and-down direction. In short, a flow of air guided by the fins 2A to 2C on the right side and a flow of air guided by the fins 2E to 2G on the left side collide at a front side of the intermediate fin 2D, so that the flow of air is blown out in such a way so as to be dispersed up and down, i.e., a vertical direction. Incidentally, the parallel air-blowing mode in FIGS. 12(*a*) and 12(*b*) is substantially the same as the state in FIGS. 3(*a*) and 3(*b*); the inclined air-blowing mode in FIGS. 14(*a*) and 14(*b*) is substantially the same as the state in FIGS. 5(*a*) and 5(*b*); and the deformation dispersive air-blowing mode in FIGS. 15(*a*) and 15(*b*) is substantially the same as the state in FIGS. 6(*a*) and 6(*b*).

Incidentally, in the wind direction adjustment device of the present invention, the details can be modified or developed with reference to the aforementioned explanation provided that they comprise the structures specified in the aforementioned aspects. As for an example thereof, there is shown the structure wherein the front frame is attached to the main member later as the case; however, the front frame may be omitted, or the shape of the main member or the shape of the front frame are optional as well. Also, in the each embodiment, the horizontal-type fin can be made as a non-moving type which does not move.

Furthermore, the aforementioned fins 2 are formed by the fins 2C and 2E which are the first fins, the fins 2B and 2F which are the second fins, and the fins 2A and 2G which are the third fins; however, in an example wherein the fins 2 are formed by five pieces, the fins 2A and 2G which are the third fins are omitted. The present invention includes such an embodiment as well.

EXPLANATION OF SYMBOLS

1 . . . a case (10A is a main member, and 10B is a front frame.)
2 . . . fins (2A to 2G are first to fifth fins.)
3 . . . a horizontal-type fin (30 is a main member, and 35 is guide grooves.)
4 . . . a slider (40 is a main member, and 42 is convex portions.)
5 . . . a knob (5A is an upper knob, 5B is a lower knob, and 5C is a decorative knob.)
6 . . . link mechanism (6A to 6D are links.)
7 . . . shaft holes
8 . . . shaft portions
9 . . . a wind direction adjustment device
12 . . . second support portions (12*a* is shaft holes, and 12*b* is arc grooves.)
13 . . . concave portions (first support portions)
15 . . . concave portions (first support portions)
20 . . . shaft portions (fin shaft portions)
21 . . . shaft portions (link shaft portions)
23 . . . a piece portion (23*a* is an arc groove.)
24 . . . shaft portions (link shaft portions)
31 . . . shaft portions
32 . . . shaft portions
43 . . . a stopper
53 . . . guide grooves Incidentally, all contents of the specification, claims, drawings, and abstract of Japanese Patent Application No. 2015-232570 filed on Nov. 30, 2015 are cited in their entireties herein and are incorporated as a disclosure of the specification of the present invention.

What is claimed is:

1. A wind direction adjustment device, comprising:
a case set to blow out air from a front-side opening portion to an outside;
a plurality of fins supported at top and bottom ends thereof in a pivotally turnable manner with respect to facing first support portions inside the case;
a link mechanism associating two or more of the fins;
a horizontal fin supported at right and left end sides thereof in a pivotally turnable manner with respect to facing second support portions inside the case; and
an operation knob supported so as to be movable to front and back and to right and left with respect to the horizontal fin, where a parallel air-blowing mode in which the fins become approximately parallel to one another and a dispersive air-blowing mode in which two or more of the fins are turned in directions opposite to each other are adjustably switched through the operation knob, wherein the parallel air-blowing mode is switched to the dispersive air-blowing mode through the link mechanism by moving operation of the operation knob forward or backward in an air-blowing direction, where by moving operation of the operation knob to a right or left side, some fins of the plurality of fins turn in an approximately same direction so as to switch a dispersive air-blowing direction, and wherein the operation knob is supported at the horizontal fin through a slider, an operation of the slider is restricted to a right-and-left direction or a front-and-back direction with respect to the horizontal fin, and an operation of the operation knob is restricted to a front-and-back direction or a right-and-left direction with respect to the slider.

2. A wind direction adjustment device according to claim 1, wherein the fins include fin shaft portions supported in a pivotally turnable manner with respect to the first support portions in the case, and link shaft portions pivotally supported at a link forming the link mechanism, and in the dispersive air-blowing mode, the fin shaft portions are disposed in front of the link shaft portions, so that two or more of the fins turn a front side outwardly to each other so as to disperse an air-blowing direction in a right-and-left direction.

3. A wind direction adjustment device according to claim 1, wherein the fins include fin shaft portions supported in a pivotally turnable manner with respect to the first support portions in the case, and link shaft portions pivotally supported at a link forming the link mechanism, and in the dispersive air-blowing mode, the fin shaft portions are disposed behind the link shaft portions, so that two or more of the fins turn a front side inwardly to each other so as to disperse an air-blowing direction in an up-and-down direction.

4. A wind direction adjustment device according to claim 1, wherein the fins can be switched among a parallel air-blowing mode where the fins become approximately parallel to one another by moving the operation knob to a usual position; a dispersive air-blowing mode where two or more of the fins turn in directions opposite to each other by moving the operation knob in a front-and-back direction from the usual position; an inclined air-blowing mode where the fins incline approximately in parallel to one another by turning the fins in a same direction by moving the operation knob in a right-and-left direction from the usual position; and a deformation dispersive air-blowing mode where inclination angles of a left side fin and a right side fin sandwiching an intermediate fin differ by moving the operation knob in a right or left direction in the dispersive air-blowing mode.

* * * * *